＃US012245257B2

United States Patent
Geng et al.

(10) Patent No.: US 12,245,257 B2
(45) Date of Patent: Mar. 4, 2025

(54) INFORMATION TRANSMISSION METHOD AND APPARATUS

(71) Applicant: Huawei Technologies Co., Ltd., Shenzhen (CN)

(72) Inventors: Tingting Geng, Shanghai (CN); Qiang Fan, Shanghai (CN); Yalin Liu, Munich (DE); Sainan Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 388 days.

(21) Appl. No.: 16/834,675

(22) Filed: Mar. 30, 2020

(65) Prior Publication Data

US 2020/0229197 A1 Jul. 16, 2020

Related U.S. Application Data

(63) Continuation of application No. PCT/CN2018/109128, filed on Sep. 30, 2018.

(30) Foreign Application Priority Data

Sep. 30, 2017 (CN) .......................... 201710940462.5

(51) Int. Cl.
*H04W 72/53* (2023.01)
*H04W 24/08* (2009.01)
(Continued)

(52) U.S. Cl.
CPC ........... *H04W 72/53* (2023.01); *H04W 24/08* (2013.01); *H04W 72/23* (2023.01); *H04W 74/0833* (2013.01)

(58) Field of Classification Search
CPC ............. H04W 72/0493; H04W 24/08; H04W 72/042; H04W 74/0833
See application file for complete search history.

(56) References Cited

U.S. PATENT DOCUMENTS

2020/0107359 A1* 4/2020 Tang .................. H04W 74/0833
2020/0252180 A1* 8/2020 Takeda ................ H04W 72/042

FOREIGN PATENT DOCUMENTS

| CN | 103621173 A | 3/2014 |
|---|---|---|
| CN | 104619036 A | 5/2015 |

(Continued)

OTHER PUBLICATIONS

"NR Random Access Procedure," 3GPP TSG RAN WG1 #90, Prague, P.R. Czechia, R1-1712532, pp. 1-8, 3rd Generation Partnership Project, Valbonne, France (Aug. 21-25, 2017).

(Continued)

*Primary Examiner* — Faruk Hamza
*Assistant Examiner* — Alan L Lindenbaum
(74) *Attorney, Agent, or Firm* — Leydig, Voit & Mayer, Ltd.

(57) ABSTRACT

This application discloses an information transmission method and apparatus, and relates to the field of wireless communications technologies. The method in this application includes: receiving first resource configuration information, where the first resource configuration information is used to indicate a transmission resource of downlink control information, the downlink control information includes information used to indicate a transmission resource of a first message in a random access process and/or information used to indicate a transmission resource of a second message in the random access process, the first message includes a random access response message, and the second message includes a contention resolution message; and then receiving the first message and/or the second message based on the downlink control information. This application is applicable to a random access procedure.

12 Claims, 10 Drawing Sheets

(51) Int. Cl.
H04W 72/23 (2023.01)
H04W 74/0833 (2024.01)

(56) References Cited

FOREIGN PATENT DOCUMENTS

| | | | |
|---|---|---|---|
| CN | 105338589 | A | 2/2016 |
| CN | 106102182 | A | 11/2016 |
| EP | 2975901 | A1 | 1/2016 |
| GB | 2560770 | A | 9/2018 |

OTHER PUBLICATIONS

"3rd Generation Partnership Project; Technical Specification Group Radio Access Network; Study on Scenarios and Requirements for Next Generation Access Technologies; (Release 15)," 3GPP TR 38.913 V15.0.0, pp. 1-39, 3rd Generation Partnership Project, Valbonne, France (Jun. 2018).

"On 4-step RACH procedure," 3GPP TSG RAN WG1 Meeting #90, Prague, Czechia, R1-1713701, pp. 1-6, 3rd Generation Partnership Project, Valbonne, France (Aug. 21-25, 2017).

"3rd Generation Partnership Project; Technical Specification Group Radio Access Network; NR; Medium Access Control (MAC) protocol specification (Release 15)," 3GPP TS 38.321 V15.7.0, pp. 1-78, 3rd Generation Partnership Project, Valbonne, France (Sep. 2019).

"Random Access in NR—Flexible UE Bandwidth Aspects," 3GPP TSG-RAN WG2 Meeting # 97, R2-1700821 (Resubmission of R2-1700019), Athens, Greece, pp. 1-5, 3rd Generation Partnership Project, Valbonne, France (Feb. 13-17, 2017).

"3rd Generation Partnership Project; Technical Specification Group Radio Access Network; NR; Physical channels and modulation (Release 15)," 3GPP TS 38.211 V15.7.0, pp. 1-97, 3rd Generation Partnership Project, Valbonne, France (Sep. 2019).

"RAR monitoring occasion in RAR window," 3GPP TSG-RAN WG2 Meeting #99bis, Prague, Czech Republic, R2-1710774, total 3 pages, 3rd Generation Partnership Project, Valbonne, France (Oct. 9-13, 2017).

"Remaining details on RACH procedure," 3GPP TSG RAN WG1 NR Ad-Hoc#3, R1-1716155, Nagoya, Japan, Total 15 pages, 3rd Generation Partnership Project, Valbonne, France (Sep. 18-21, 2017).

"PRACH Procedure Considerations," 3GPP TSG-RAN WG1 Meeting NR#3, R1-1716384, Nagoya, Japan, Total 17 pages, 3rd Generation Partnership Project, Valbonne, France (Sep. 18-21, 2017).

"MAC modelling of PDCCH monitoring and TTI length," 3GPP TSG-RAN WG2 Meeting #99bis, R2-1711427 Revisions of R2-1709254, Prague, Czech Republic, Total 16 pages, 3rd Generation Partnership Project, Valbonne, France (Oct. 9-13, 2017).

* cited by examiner

INFORMATION TRANSMISSION METHOD AND APPARATUS

CROSS-REFERENCE TO RELATED APPLICATIONS

This application is a continuation of International Application No. PCT/CN2018/109128, filed on Sep. 30, 2018, which claims priority to Chinese Patent Application No. 201710940462.5, filed on Sep. 30, 2017. The disclosures of the aforementioned applications are hereby incorporated by reference in their entireties.

TECHNICAL FIELD

This application relates to the field of wireless communications technologies, and in particular, to an information transmission method and apparatus.

BACKGROUND

With development of communications technologies, efficiency requirements on wireless communications become increasingly high. A time used by a terminal to switch from a power saving state (for example, an idle state or an inactive state of the terminal) to a connected state (for example, a continuous data transmission state) is defined as a control plane latency in a new radio (NR) system.

A process in which the terminal switches from the power saving state to the connected state includes a random access process of the terminal. An existing random access process includes a message 1 to a message 4, and minimum duration of the random access process is greater than 12 ms. A more desirable random access mechanism needs to be considered to reduce the control plane latency.

SUMMARY

Embodiments of this application provide an information transmission method and apparatus, to resolve a problem of a high control plane latency that is caused by a relatively long time taken in a process in which a terminal switches from a power saving state to a connected state.

To achieve the foregoing objective, the following technical solutions are used in the embodiments of this application:

According to a first aspect, an embodiment of this application provides an information transmission method. The method includes: receiving first resource configuration information, and then receiving a first message and/or a second message based on downlink control information. The first resource configuration information is used to indicate a transmission resource of the downlink control information, the downlink control information includes information used to indicate a transmission resource of the first message in a random access process and/or information used to indicate a transmission resource of the second message in the random access process, the first message includes a random access response message, and the second message includes a contention resolution message. According to the solution in this embodiment of this application, a terminal receives the first message and/or the second message based on the downlink control information, so that time points at which a base station sends the first message and the second message are the same as time points at which the terminal receives the first message and the second message. In this way, when a processing speed of the base station is increased, the terminal can still accurately receive the first message and/or the second message in time. This shortens a time of the random access process, thereby reducing a control plane latency.

Optionally, the downlink control information is information carried on a downlink control channel, and the downlink control channel may be a PDCCH. The PDCCH carries an indication of the transmission resource of the first message and/or an indication of the transmission resource of the second message. This may also be understood as that the downlink control information carried on the PDCCH is used to schedule a PDSCH carrying the first message and/or the second message.

In a possible manner, the first resource configuration information indicates a transmission resource of one type of downlink control information, in other words, the first resource configuration information includes one set of resource combinations, and the downlink control information includes the information used to indicate the transmission resource of the first message in the random access process and/or the information used to indicate the transmission resource of the second message in the random access process.

In another possible implementation, the first resource configuration information separately indicates a transmission resource of downlink control information corresponding to the first message and a transmission resource of downlink control information corresponding to the second message. The downlink control information corresponding to the first message includes the information used to indicate the transmission resource of the first message, and the downlink control information of the second message includes the information used to indicate the transmission resource of the second message.

In a possible design, the receiving first resource configuration information may be implemented as: receiving system indication information from a network side device, where the system indication information includes the first resource configuration information.

In a possible design, a transmission resource of the system indication information is indicated by using second resource configuration information.

In a possible design, the method further includes: receiving first indication information from the network side device, where the first indication information is used to indicate whether the first resource configuration information is the same as the second resource configuration information, or the first indication information is used to indicate whether the system indication information carries the first resource configuration information. According to the technical solution in this embodiment of this application, if the first resource configuration information is the same as the second resource configuration information, the terminal can determine the transmission resource of the system indication information and the transmission resource of the downlink control information based on the second resource configuration information (where the downlink control information includes the information used to indicate the transmission resource of the first message and/or the information used to indicate the transmission resource of the second message), and the first resource configuration information does not need to be additionally received. This can reduce network overheads.

In a possible design, when the first resource configuration information is the same as the second resource configuration information, or the system indication information does not carry the first resource configuration information, the receiving first resource configuration information may be implemented as: receiving the second resource configuration information from the network side device.

In a possible design, the receiving first resource configuration information may alternatively be implemented as: receiving an index of first resource configuration information from the network side device, and then determining the first resource configuration information corresponding to the index of the first resource configuration information.

In a possible design, the method further includes: determining, based on terminal information, the first resource configuration information corresponding to the terminal information.

The terminal information includes at least one of the following information:
- a time-frequency resource of a physical random access control channel PRACH, a preamble index, a preamble format, an air interface access technology numerology parameter, and a service type, where
- the numerology parameter includes at least one of the following information: subcarrier spacing, a transmission time interval TTI length, a cyclic prefix CP length, transmission bandwidth, and a quantity of orthogonal frequency division multiplexing OFDM symbols in each slot.

In a possible design, the first resource configuration information includes at least one of the following information: a frequency domain position of a downlink control channel carrying the downlink control information, a time domain position of the downlink control channel, a sequence number of a start OFDM symbol of the downlink control channel, monitoring duration of monitoring the downlink control channel each time, a monitoring cycle of the downlink control channel, a resource group size of the transmission resource of the downlink control information, and a transmission type of the downlink control channel.

In a possible design, a method for receiving the first message and/or the second message based on the first resource configuration information is:
- if a start time point of a reception time window of the first message is located in a first continuous monitoring time period indicated by the first resource configuration information, receiving, on a transmission resource corresponding to an overlapping time period between the first continuous monitoring time period and the reception time window of the first message and a transmission resource corresponding to another complete continuous monitoring time period located in the reception time window of the first message, downlink control information corresponding to the first message, and receiving the first message based on the downlink control information corresponding to the first message; or
- if a start time point of a reception time window of the first message is located in a first continuous monitoring time period indicated by the first resource configuration information, receiving, on a transmission resource corresponding to the first continuous monitoring time period and a transmission resource corresponding to another complete continuous monitoring time period located in the reception time window of the first message, downlink control information corresponding to the first message, and receiving the first message based on the downlink control information corresponding to the first message; or
- if a start time point of a reception time window of the first message is located in a first continuous monitoring time period indicated by the first resource configuration information, receiving, on a transmission resource corresponding to another complete continuous monitoring time period located in the reception time window of the first message, downlink control information corresponding to the first message, and receiving the first message based on the downlink control information corresponding to the first message; and/or
- if a start time point of a reception time window of the second message is located in a second continuous monitoring time period indicated by the first resource configuration information, receiving, on a transmission resource corresponding to an overlapping time period between the second continuous monitoring time period and the reception time window of the second message and a transmission resource corresponding to another complete continuous monitoring time period located in the reception time window of the second message, downlink control information corresponding to the second message, and receiving the second message based on the downlink control information corresponding to the second message; or
- if a start time point of a reception time window of the second message is located in a second continuous monitoring time period indicated by the first resource configuration information, receiving, on a transmission resource corresponding to the second continuous monitoring time period and a transmission resource corresponding to another complete continuous monitoring time period located in the reception time window of the second message, downlink control information corresponding to the second message, and receiving the second message based on the downlink control information corresponding to the second message; or
- if a start time point of a reception time window of the second message is located in a second continuous monitoring time period indicated by the first resource configuration information, receiving, on a transmission resource corresponding to another complete continuous monitoring time period located in the reception time window of the second message, downlink control information corresponding to the second message, and receiving the second message based on the downlink control information corresponding to the second message.

In a possible design, a method for receiving the first message and/or the second message based on the first resource configuration information is:
- if an end time point of a reception time window of the first message is located in a third continuous monitoring time period indicated by the first resource configuration information, receiving, on a transmission resource corresponding to an overlapping time period between the third continuous monitoring time period and the reception time window of the first message and a transmission resource corresponding to another complete continuous monitoring time period located in the reception time window of the first message, downlink control information corresponding to the first message, and receiving the first message based on the downlink control information corresponding to the first message; or
- if an end time point of a reception time window of the first message is located in a third continuous monitoring time period indicated by the first resource configuration information, receiving, on a transmission resource corresponding to the third continuous monitoring time period and a transmission resource corresponding to another complete continuous monitoring time period located in the reception time window of the first message, downlink control information corresponding to the first message, and receiving the first message based on the downlink control information corresponding to the first message; or if an end time point of a reception time window of the first message is located in a third continuous monitoring time period indicated by the first resource configuration information, receiving, on a transmission resource corresponding to another complete continuous monitoring time period located in the reception time window of the first message, downlink control information corresponding to the first message, and receiving the first message based on the downlink control information corresponding to the first message; and/or if an end time point of a reception time window of the second message is located in a fourth continuous monitoring time period indicated by the first resource configuration information, receiving, on a transmission resource corresponding to an overlapping time period between the fourth continuous monitoring time period and the reception time window of the second message and a transmission resource corresponding to another complete continuous monitoring time period located in the reception time window of the second message, downlink control information corresponding to the second message, and receiving the second message based on the downlink control information corresponding to the second message; or if an end time point of a reception time window of the second message is located in a fourth continuous monitoring time period indicated by the first resource configuration information, receiving, on a transmission resource corresponding to the fourth continuous monitoring time period and a transmission resource corresponding to another complete continuous monitoring time period located in the reception time window of the second message, downlink control information corresponding to the second message, and receiving the second message based on the downlink control information corresponding to the second message; or if an end time point of a reception time window of the second message is located in a fourth continuous monitoring time period indicated by the first resource configuration information, receiving, on a transmission resource corresponding to another complete continuous monitoring time period located in the reception time window of the second message, downlink control information corresponding to the second message, and receiving the second message based on the downlink control information corresponding to the second message.

According to a second aspect, an embodiment of this application provides an information transmission method. The method includes: sending first resource configuration information to a terminal, where the first resource configuration information is used to indicate a transmission resource of downlink control information, the downlink control information includes information used to indicate a transmission resource of a first message in a random access process and/or information used to indicate a transmission resource of a second message in the random access process, the first message includes a random access response message, and the second message includes a contention resolution message; and sending the first message and the second message to the terminal. According to the solution in this embodiment of this application, a base station sends the first resource configuration information to the terminal, so that the terminal can receive the first message and/or the second message based on the downlink control information. Time points at which the base station sends the first message and the second message are the same as time points at which the terminal receives the first message and the second message. In this way, when a processing speed of the base station is increased, the terminal can still accurately receive the first message and the second message in time. This shortens a time of the random access process. It is equivalent to shortening a time taken for the terminal to switch from a power saving state to a connected state, thereby reducing a control plane latency.

Optionally, the downlink control information is information carried on a downlink control channel, and the downlink control channel may be a PDCCH. The PDCCH carries an indication of the transmission resource of the first message and/or an indication of the transmission resource of the second message. This may also be understood as that the downlink control information carried on the PDCCH is used to schedule a PDSCH carrying the first message and/or the second message.

In a possible manner, the first resource configuration information indicates a transmission resource of one type of downlink control information, in other words, the first resource configuration information includes one set of resource combinations, and the downlink control information includes the information used to indicate the transmission resource of the first message in the random access process and/or the information used to indicate the transmission resource of the second message in the random access process.

In another possible implementation, the first resource configuration information separately indicates a transmission resource of downlink control information corresponding to the first message and a transmission resource of downlink control information corresponding to the second message. The downlink control information corresponding to the first message includes the information used to indicate the transmission resource of the first message, and the downlink control information of the second message includes the information used to indicate the transmission resource of the second message.

In a possible design, a method for the sending first resource configuration information to a terminal is: sending system indication information to the terminal, where the system indication information includes the first resource configuration information.

In a possible design, a transmission resource of the system indication information is indicated by using second resource configuration information.

In a possible design, the method further includes: sending first indication information to the terminal, where the first indication information is used to indicate whether the first resource configuration information is the same as the second resource configuration information, or the first indication information is used to indicate whether the system indication information carries the first resource configuration information. According to the technical solution in this embodiment of this application, if the first resource configuration information is the same as the second resource configuration information, the second resource configuration information sent to the terminal can indicate the transmission resource of the system indication information and the transmission resource of the downlink control information (where the downlink control information includes the information used to indicate the transmission resource of the first message and/or the information used to indicate the transmission resource of the second message), and the first resource configuration information does not need to be additionally sent. This reduces network overheads.

In a possible design, when the first resource configuration information is the same as the second resource configuration information, the sending first resource configuration information to a terminal may be implemented as: sending the second resource configuration information to the terminal.

In a possible design, the sending first resource configuration information to a terminal may be implemented as: sending an index of the first resource configuration information to the terminal.

In a possible design, the first configuration information includes at least one of the following information: a frequency domain position of a downlink control channel carrying the downlink control information, a time domain position of the downlink control channel, a sequence number of a start OFDM symbol of the downlink control channel, monitoring duration of monitoring the downlink control channel each time, a monitoring cycle of the downlink control channel, a resource group size of the transmission resource of the downlink control information, and a transmission type of the downlink control channel.

According to a third aspect, an embodiment of this application provides an information transmission apparatus. The apparatus has a function of implementing the method according to the first aspect. The function may be implemented by hardware, or may be implemented by hardware executing corresponding software. The hardware or software includes one or more modules corresponding to the foregoing function. For example, the apparatus may be a terminal, or may be a chip in a terminal.

In a possible design, the apparatus is a terminal, the terminal includes a processor, and the processor is configured to support the terminal in performing the corresponding function in the foregoing method. Further, the terminal may include a transmitter and a receiver. The transmitter and the receiver are configured to support the terminal in communicating with a network side device. Further, the terminal may include a memory. The memory is configured to be coupled to the processor, and store a program instruction and data that are necessary for the terminal.

According to a fourth aspect, an embodiment of this application provides an information transmission apparatus. The apparatus has a function of implementing the method according to the second aspect. The function may be implemented by hardware, or may be implemented by hardware executing corresponding software. The hardware or software includes one or more modules corresponding to the foregoing function. For example, the apparatus may be a base station, or may be a chip in a base station.

In a possible design, the apparatus is a base station, the base station includes a processor, and the processor is configured to support the base station in performing the corresponding function in the foregoing method. Further, the base station may include a transmitter and a receiver. The transmitter and the receiver are configured to support the base station in communicating with a terminal. Further, the base station may include a memory. The memory is configured to be coupled to the processor, and store a program instruction and data necessary for the base station.

According to a fifth aspect, an embodiment of this application provides a communications system. The system includes the terminal and the network side device according to the foregoing aspects.

According to a sixth aspect, an embodiment of this application provides a computer-readable storage medium. The computer-readable storage medium stores an instruction, and when the instruction is run on a computer, the computer is enabled to perform the method according to the first aspect.

According to a seventh aspect, an embodiment of this application provides a computer-readable storage medium. The computer-readable storage medium stores an instruction, and when the instruction is run on a computer, the computer is enabled to perform the method according to the second aspect.

According to an eighth aspect, an embodiment of this application provides a computer program product including an instruction, and when the computer program product is run on a computer, the computer is enabled to perform the method according to the first aspect.

According to a ninth aspect, an embodiment of this application provides a computer program product including an instruction, and when the computer program product is run on a computer, the computer is enabled to perform the method according to the second aspect.

According to a tenth aspect, an embodiment of this application provides a chip system, applied to a terminal. The chip system includes at least one processor, at least one memory, and at least one interface circuit. The memory, the interface circuit, and the at least one processor are connected to each other via lines, and the at least one memory stores an instruction. The instruction is executed by the processor, to perform the method according to the first aspect.

According to an eleventh aspect, an embodiment of this application provides a chip system, applied to a network side device. The chip system includes at least one processor, at least one memory, and at least one interface circuit. The memory, the transceiver, and the at least one processor are connected to each other via lines, and the at least one memory stores an instruction. The instruction is executed by the processor, to perform the method according to the second aspect.

According to the solutions in the embodiments of this application, the terminal receives the first message and/or the second message based on the downlink control information, so that the time points at which the base station sends the first message and the second message are the same as the time points at which the terminal receives the first message and the second message. In this way, when the processing speed of the base station is increased, the terminal can still accurately receive the first message and/or the second message in time. This shortens the time of the random access process, thereby reducing the control plane latency.

DESCRIPTION OF EMBODIMENTS

System architectures and service scenarios described in this application aim to more clearly describe the technical solutions in this application, but are not intended to limit the technical solutions provided in this application. A person of ordinary skill in the art may learn that as the system architectures evolve and a new service scenario emerged, the technical solutions provided in this application are also applicable to a similar technical problem.

It should be noted that, in this application, words such as "example" or "for example" are used as an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

In this application, "of)", "relevant", and "corresponding" may be interchangeably used sometimes. It should be pointed out that, consistent meanings are expressed when differences are not emphasized.

It should be noted that, an information transmission method in this application may relate to a first communications apparatus and a second communications apparatus. The first communications apparatus may be a network side device or a chip applicable to a network side device; the second communications apparatus may be a terminal or a chip applicable to a terminal.

For ease of description, in this application, the information transmission method is described without repetition by using an example in which the first communications apparatus is a network side device and the second communications apparatus is a terminal.

Embodiments of this application are applicable to an NR system or a subsequent evolved system. This is not limited in the embodiments of this application.

Figure 1:
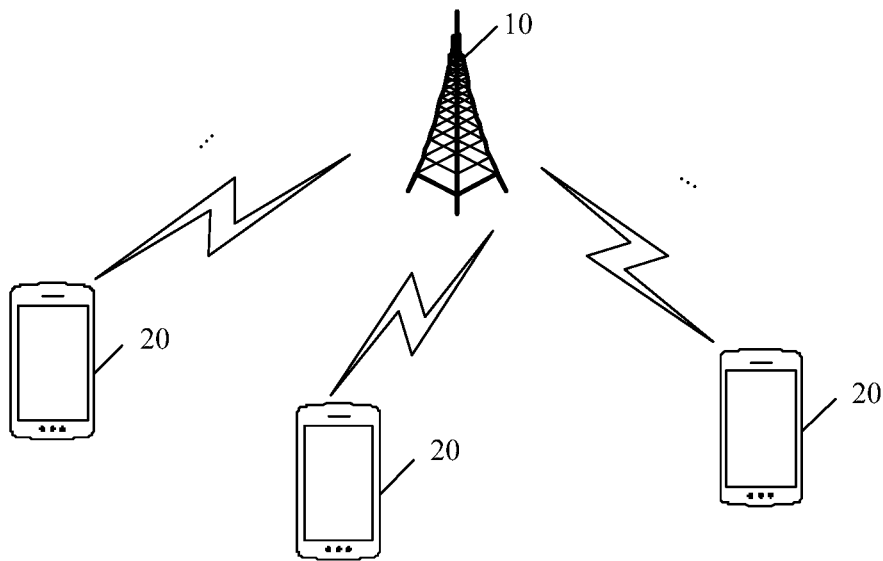
FIG. 1 is a schematic diagram of a possible communications system according to an embodiment of this application.

FIG. 1 is a schematic diagram of a possible communications system according to this application. The communications system may include at least one network side device 10 (where only one network side device 10 is shown in the figure) and one or more terminals 20 that can communicate with the network side device 10.

The network side device in this application may also be referred to as a base station in a wireless communications standard, and in most scenarios, is an apparatus that is deployed in a radio access network and that is configured to provide a wireless communication function for a terminal. The network side device in this application includes, but is not limited to, various forms of macro base stations, micro base stations (also referred to as small cells), relay stations, transmission/reception points (TRP), next-generation NodeBs (gNB), evolved NodeBs connected to a next-generation core network (ng-eNB), and the like; and may further include a radio access network device in a non-third generation partnership project (3GPP) system, such as a wireless local area network (WLAN) access device. Names of radio access network devices having similar wireless communication functions may vary with systems using different radio access technologies. Merely for ease of description, in the embodiments of this application, the foregoing apparatuses that can provide the wireless communication function for the terminal are collectively referred to as the network side device.

The terminal in this application is a device having a radio transceiver function. The device may be deployed on land, including an indoor or outdoor device, a handheld device, or an in-vehicle device; or may be deployed on water (for example, on a steamer); or may be deployed in air (for example, on an air plane, a balloon, or a satellite). The terminal may include various types of mobile phones, tablet computers (Pad), computers having a radio transceiver function, wireless data cards, virtual reality (VR) terminal devices, augmented reality (AR) terminal devices, terminal devices for machine type communication (MTC), terminal devices in industrial control, terminal devices in self driving, terminal devices in remote medical surgery (remote medical), terminal devices in a smart grid, terminal devices in transportation safety, terminal devices in a smart city, terminal devices in a smart home (a home device, for example, a refrigerator, a television, a washer, or furniture that has a wireless communication function), wearable devices (for example, a smart watch, a smart band, or a pedometer), and the like. The terminal in this application may alternatively be set to be a device that is at a fixed location and that has a wireless communication function similar to that of the foregoing terminal device. Names of terminals having similar wireless communication functions may vary with systems using different radio access technologies. Merely for ease of description, in the embodiments of this application, the foregoing apparatuses having a radio transceiver communication function are collectively referred to as the terminal.

Figure 2:
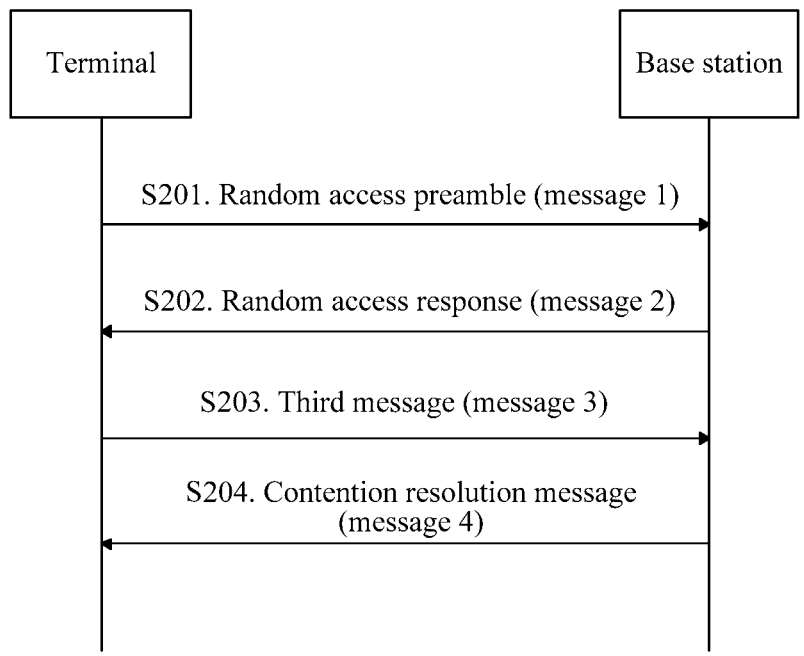
FIG. 2 is a flowchart of a method of a random access process according to an embodiment of this application.

In the NR system, a terminal switches from an inactive state or an idle state to a connected state through a random access process. As shown in FIG. 2, the random access process may include the following steps.

S201. The terminal sends a random access preamble to a base station, where the random access preamble sent by the terminal may be referred to as a message 1 herein.

S202. The base station sends a random access response message to the terminal, where the random access response message sent by the base station to the terminal may be referred to as a message 2 herein.

S203. The terminal sends a third message to the base station, where the third message sent by the terminal may be referred to as a message 3 herein.

S204. The base station sends a contention resolution message to the terminal, where the contention resolution message sent by the base station to the terminal may be referred to as a message 4 herein.

Both the message 3 and the message 4 may be understood as messages in a contention resolution process.

Based on the random access process shown in FIG. 2, calculation is performed by using a minimum latency of each step in a long term evolution (LTE) system. A time occupied by step S201 is 1 ms. After an interval of 3 ms, the terminal receives the message 2 at a start time point of a random access response time window (Random access response window, RAR window). After an interval of 6 ms, the terminal sends the message 3 to the base station, and then the terminal receives the message 4 after 2 ms. Therefore, a minimum latency of the random access process in LTE is greater than 12 ms.

Figure 3:
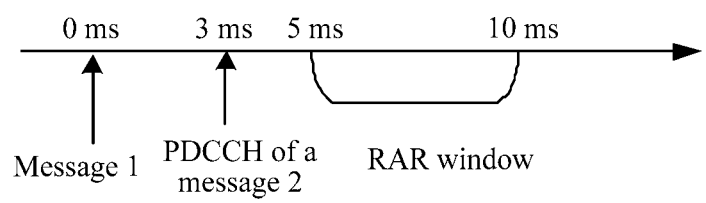
FIG. 3 is an example of a schematic diagram of a relationship between a RAR window and a random access response message arrival time according to an embodiment of this application.

In the NR system, a processing speed of the base station is increased to reduce a time used for the random access process. For example, the time interval between step S201 and step S202 may be shortened, and the time interval between step S203 and step S204 may be shortened. However, after the processing speed of the base station is increased, if the terminal still receives the message 2 in the RAR window and receives the message 4 in a reception time window of the message 4 (where the reception time window of the message 4 is referred to as a contention resolution time window below), a receiving speed of the terminal cannot adapt to the processing speed of the base station. For example, as shown in FIG. 3, it is assumed that the RAR window is the $5^{th}$ ms to the $10^{th}$ ms after the terminal sends the message 1, and the base station increases a speed of processing the message 1. For example, the base station may send, at the $3^{rd}$ ms after receiving the message 1, a physical downlink control channel (PDCCH) used to schedule a physical downlink shared channel (PDSCH) carrying the message 2. According to an existing RAR receiving mechanism, the terminal starts monitoring the PDCCH at the $5^{th}$ ms, and cannot monitor the PDCCH in advance. Therefore, it needs to be further considered to modify the mechanism of receiving the RAR by the terminal.

To resolve the foregoing problem, a solution provided in this application is: The base station sends first resource configuration information to the terminal, where the first resource configuration information is used to indicate a transmission resource of downlink control information, and the downlink control information includes information used to indicate a transmission resource of a first message in the random access process and/or information used to indicate a transmission resource of a second message in the random access process. Then, the base station sends the first message and/or the second message to the terminal, and the terminal receives the first message and/or the second message based on the downlink control information. According to the method, the base station can notify the terminal of the information about the transmission resource of the first message and/or the information about the transmission resource of the second message, so that when the processing speed of the base station is increased, the terminal can accurately receive the first message and/or the second message in time. This shortens the time taken for the random access process, thereby reducing a control plane latency.

The technical solutions provided in this application are described in detail below.

Figure 4:
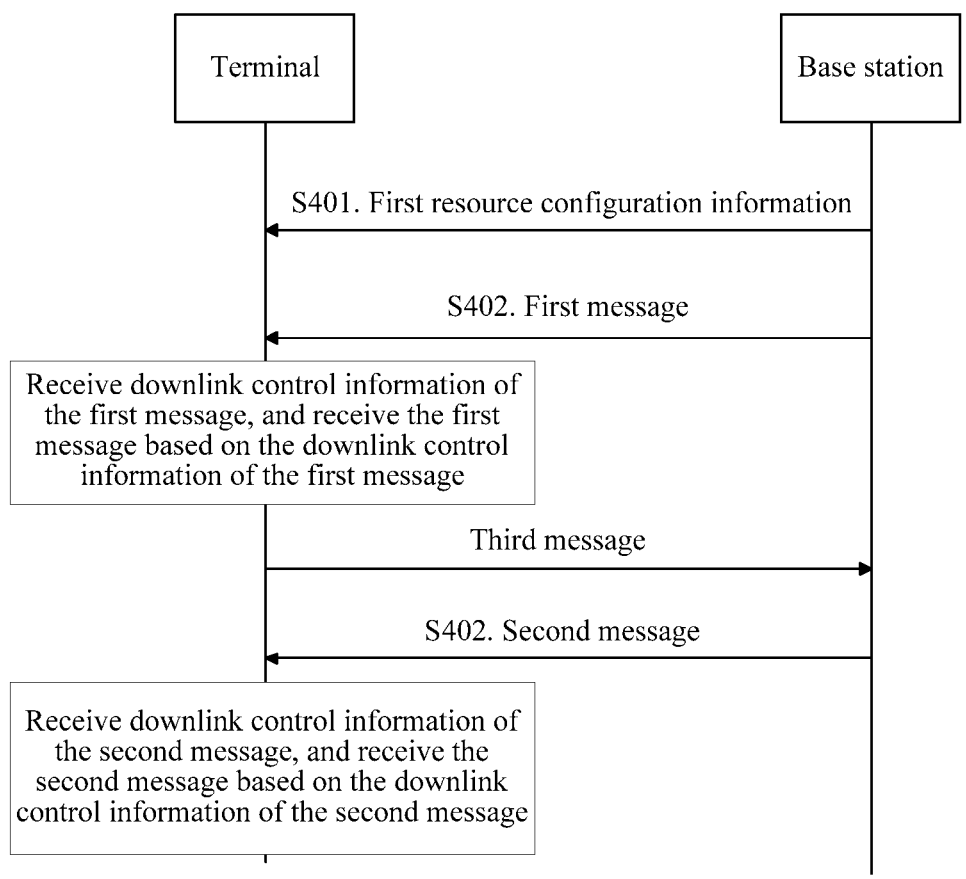
FIG. 4 is a flowchart of an information transmission method according to an embodiment of this application.

As shown in FIG. 4, an embodiment of this application provides an information transmission method. Descriptions are provided in this embodiment of this application by using a base station as a network side device. The method includes the following steps.

S401. The base station sends first resource configuration information to a terminal.

Correspondingly, the terminal receives the first resource configuration information from the base station.

Optionally, the base station may perform step S401 before a random access process, for example, may perform step S401 before step S201.

The first resource configuration information is used to indicate a transmission resource of downlink control information. The downlink control information includes information used to indicate a transmission resource of a first message in the random access process and/or information used to indicate a transmission resource of a second message in the random access process. The first message includes a random access response message. The second message includes a contention resolution message.

Optionally, the downlink control information is information carried on a downlink control channel. The downlink control channel may be a PDCCH. The PDCCH carries an indication of the transmission resource of the first message and/or an indication of the transmission resource of the second message. This may also be understood as that the downlink control information carried on the PDCCH is used to schedule a PDSCH carrying the first message and/or the second message.

The transmission resource of the downlink control information herein may include at least one of the following items: a frequency domain position of the downlink control channel carrying the downlink control information, a time domain position of the downlink control channel, a sequence number of a start OFDM symbol of the downlink control channel, monitoring duration of monitoring the downlink control channel each time, a monitoring cycle of the downlink control channel, a resource group size of the transmission resource of the downlink control information, and a transmission type of the downlink control channel. Transmission resource information obtained through combination of various resources herein may be referred to as a set of transmission resources or a type of transmission resource.

In a first possible manner, the first resource configuration information indicates a transmission resource of one type of downlink control information, in other words, the first resource configuration information includes one set of resource combinations, and the downlink control information includes the information used to indicate the transmission resource of the first message in the random access process and/or the information used to indicate the transmission resource of the second message in the random access process. In this possible manner, there may be the following three cases:

In a first case, the downlink control information indicated by the first resource configuration information includes only the information about the transmission resource of the first message. Further, the downlink control information indicated by the first resource configuration information or the first message may include information used to indicate a transmission resource of downlink control information corresponding to the second message. The downlink control information corresponding to the second message includes the information used to indicate the transmission resource of the second message. (For example, the first resource configuration information indicates a time-frequency resource of a PDCCH corresponding to the first message, and downlink control information carried on the PDCCH is used to schedule a PDSCH carrying the first message. Optionally, the downlink control information carried on the PDCCH corresponding to the first message may further include information used to indicate a time-frequency resource of a PDCCH corresponding to the second message, or the first message carries information used to indicate a time-frequency resource of a PDCCH corresponding to the second message, and downlink control information carried on the PDCCH corresponding to the second message is used to schedule a PDSCH carrying the second message.)

In a second case, the downlink control information indicated by the first resource configuration information includes only the information used to indicate the transmission resource of the second message. Further, the information used to indicate the transmission resource of the first message is preconfigured by the base station or predefined in a protocol. For a configuration method, refer to the prior art.

In a third case, the downlink control information indicated by the first resource configuration information includes the information about the transmission resource of the first message and the information about the transmission resource of the second message. In this case, a transmission resource of downlink control information corresponding to the first message is the same as that of downlink control information corresponding to the second message.

In a second possible implementation, the first resource configuration information separately indicates a transmission resource of downlink control information corresponding to the first message and a transmission resource of downlink control information corresponding to the second message. The downlink control information corresponding to the first message includes the information used to indicate the transmission resource of the first message. The downlink control information of the second message includes the information used to indicate the transmission resource of the second message. It should be noted that, a procedure in this embodiment of this application is explained and described below by using the first possible implementation as an example.

Optionally, when the base station sends only the first message to the terminal and does not send the second message to the terminal, the first resource configuration information is used to indicate only the transmission resource of the downlink control information corresponding to the first message. The downlink control information corresponding to the first message includes the information used to indicate the transmission resource of the first message.

The first configuration information may include at least one of the following information: the frequency domain position of the downlink control channel carrying the downlink control information, the time domain position of the downlink control channel, the sequence number of the start OFDM symbol of the downlink control channel, the monitoring duration of monitoring the downlink control channel each time, the monitoring cycle of the downlink control channel, the resource group size of the downlink control information of the downlink control information, and the transmission type of the downlink control channel.

For example, the first resource configuration information indicates a transmission resource of the PDCCH carrying the downlink control information. A frequency domain position of the PDCCH carrying the downlink control information may be a number of a physical resource block (PRB). A time domain position of the PDCCH carrying the downlink control information is a sequence number of an orthogonal frequency division multiplexing (OFDM) symbol occupied by the PDCCH. In addition, the time domain position of the PDCCH carrying the downlink control information may alternatively be determined based on a sequence number of a start OFDM symbol and monitoring duration. A monitoring cycle is a time interval between two times of monitoring the PDCCH carrying the downlink control information. A transmission type may be interleaving transmission or non-interleaving transmission.

S402. The base station sends the first message and the second message to the terminal.

It should be noted that, the first message and the second message in step S402 are not simultaneously sent. Specifically, referring to the random access process in FIG. 2, the base station sends the first message after receiving a random access preamble from the terminal, and sends the second message after receiving a third message from the terminal.

In a possible manner, sending occasions of the first message and the second message may be determined based on the downlink control information.

Optionally, the base station sends the downlink control information by using the transmission resource that is of the downlink control information and that is indicated by the first resource configuration information. The sent downlink control information includes the information indicating the transmission resource of the first message in the random access process and/or the information indicating the transmission resource of the second message in the random access process. The base station sends the first message and/or the second message on the indicated transmission resource of the first message in the random access process and/or the indicated transmission resource of the second message in the random access process. The transmission resource, of the downlink control information, that is indicated by the first resource configuration information and that is used when the base station sends the downlink control information is the same as the transmission resource that is of the downlink control information and that is indicated by the first resource configuration information sent to the terminal before the base station receives the random access preamble.

Optionally, if the downlink control information includes only the information used to indicate the transmission resource of the first message, after receiving the random access preamble, the base station adds the downlink control information of the first message to a PDCCH corresponding to the transmission resource of the downlink control information, where the downlink control information includes the information used to indicate the transmission resource of the first message; and adds the first message to a PDSCH corresponding to the information about the transmission resource of the first message. Further, the downlink control information of the first message or the first message includes the information used to indicate the transmission resource of the downlink control information corresponding to the second message. Then, after receiving the third message, the base station adds the downlink control information corresponding to the second message to a PDCCH indicated by the transmission resource of the downlink control information corresponding to the second message. The downlink control information corresponding to the second message includes the information used to indicate the transmission resource of the second message.

If the downlink control information includes only the information used to indicate the transmission resource of the second message, a method for sending the first message by the base station is the same as a method for sending the random access response message by the base station in the random access process in FIG. 2. Specifically, a PDSCH is scheduled by using a PDCCH corresponding to a transmission resource preconfigured or predefined in a protocol. The PDSCH carries the first message. Then, after receiving the third message, the base station adds the downlink control information to a PDCCH corresponding to the transmission resource of the downlink control information, where the downlink control information includes the information used to indicate the transmission resource of the second message; and adds the second message to a PDSCH corresponding to the information about the transmission resource of the second message.

If the downlink control information includes the information used to indicate the transmission resource of the first message and the information used to indicate the transmission resource of the second message, after receiving the random access preamble, the base station adds the downlink control information to a PDCCH corresponding to the transmission resource of the downlink control information, where the downlink control information includes the information used to indicate the transmission resource of the first message; and adds the first message to a PDSCH corresponding to the information about the transmission resource of the first message. Then, after receiving the third message, the base station adds the downlink control information to the PDCCH corresponding to the transmission resource of the downlink control information, where the downlink control information includes the information used to indicate the transmission resource of the second message; and adds the second message to a PDSCH corresponding to the information about the transmission resource of the second message.

Corresponding to step S402, a method for receiving the first message and/or the second message by the terminal based on the first resource configuration information is described below.

Optionally, corresponding to step S402, referring to the random access process in FIG. 2, if the downlink control information indicated by the first resource configuration information includes only the information used to indicate the transmission resource of the first message, after sending the random access preamble, the terminal receives the downlink control information on the PDCCH corresponding to the transmission resource that is of the downlink control information and that is indicated by the first resource configuration information. The received downlink control information includes the information used to indicate the transmission resource of the first message. Further, the terminal receives the first message on the PDSCH corresponding to the transmission resource of the first message. The downlink control information corresponding to the first message or the first message includes the information used to indicate the transmission resource of the downlink control information corresponding to the second message. After sending the third message, the terminal receives the downlink control information corresponding to the second message on the PDCCH of the transmission resource of the downlink control information corresponding to the second message, obtains the information used to indicate the transmission resource of the second message from the downlink control information corresponding to the second message, and further receives the second message on the PDSCH corresponding to the transmission resource of the second message.

If the downlink control information indicated by the first resource configuration information includes only the information used to indicate the transmission resource of the second message, a method for receiving the first message by the terminal is the same as a method for receiving the random access response message by the terminal in FIG. 2. After sending the third message, the terminal receives the downlink control information on the PDCCH corresponding to the transmission resource that is of the downlink control information and that is indicated by the first resource configuration information, where the received downlink control information includes the information used to indicate the transmission resource of the second message in the random access process; and receives the second message on the PDSCH corresponding to the transmission resource of the second message.

If the downlink control information indicated by the first resource configuration information includes the information used to indicate the transmission resource of the first message in the random access process and the information used to indicate the transmission resource of the second message in the random access process, after sending the random access preamble, the terminal receives the downlink control information on the PDCCH corresponding to the transmission resource that is of the downlink control information and that is indicated by the first resource configuration information, where the received downlink control information includes the information used to indicate the transmission resource of the first message in the random access process; and receives the first message on the PDSCH corresponding to the transmission resource of the first message. After sending the third message, the terminal receives the downlink control information on the PDCCH corresponding to the transmission resource that is of the downlink control information and that is indicated by the first resource configuration information, where the received downlink control information includes the information used to indicate the transmission resource of the second message in the random access process; and receives the second message on the PDSCH corresponding to the transmission resource of the second message.

According to the information transmission method provided in this embodiment of this application, the base station sends the downlink control information to the terminal, and the downlink control information includes the information used to indicate the transmission resource of the first message in the random access process and/or the information used to indicate the transmission resource of the second message in the random access process. Further, the base station sends the first message and the second message based on the downlink control information, and the terminal receives the first message and/or the second message based on the downlink control information, so that time points at which the base station sends the first message and the second message are the same as time points at which the terminal receives the first message and the second message. In this way, when a processing speed of the base station is increased, the terminal can still accurately receive the first message and/or the second message in time. This shortens a time of the random access process, thereby reducing a control plane latency.

It may be understood that the terminal or the network side device can perform some or all steps in the foregoing embodiment. These steps or operations are merely examples. In this embodiment of this application, another operation or various variants of the operations may alternatively be performed. In addition, the steps may be performed in an order different from that presented in the foregoing embodiment, and the operations in the foregoing embodiment may not need to be all performed.

In this embodiment of this application, step S401 may be performed before the random access process. In this embodiment of this application, the first resource configuration information may be carried in the system indication information, and the system indication information may be one of a master system information block (Master Information Block, MIB), a system information block 1 (SIB 1), or remaining minimum system information (RMSI). Specifically, the embodiments of this application provide two methods for sending first resource configuration information that are methods described in embodiments corresponding to FIG. 5 and FIG. 6. Descriptions are provided in the embodiments corresponding to FIG. 5 and FIG. 6 by using a complete random access process as an example.

Figure 5:
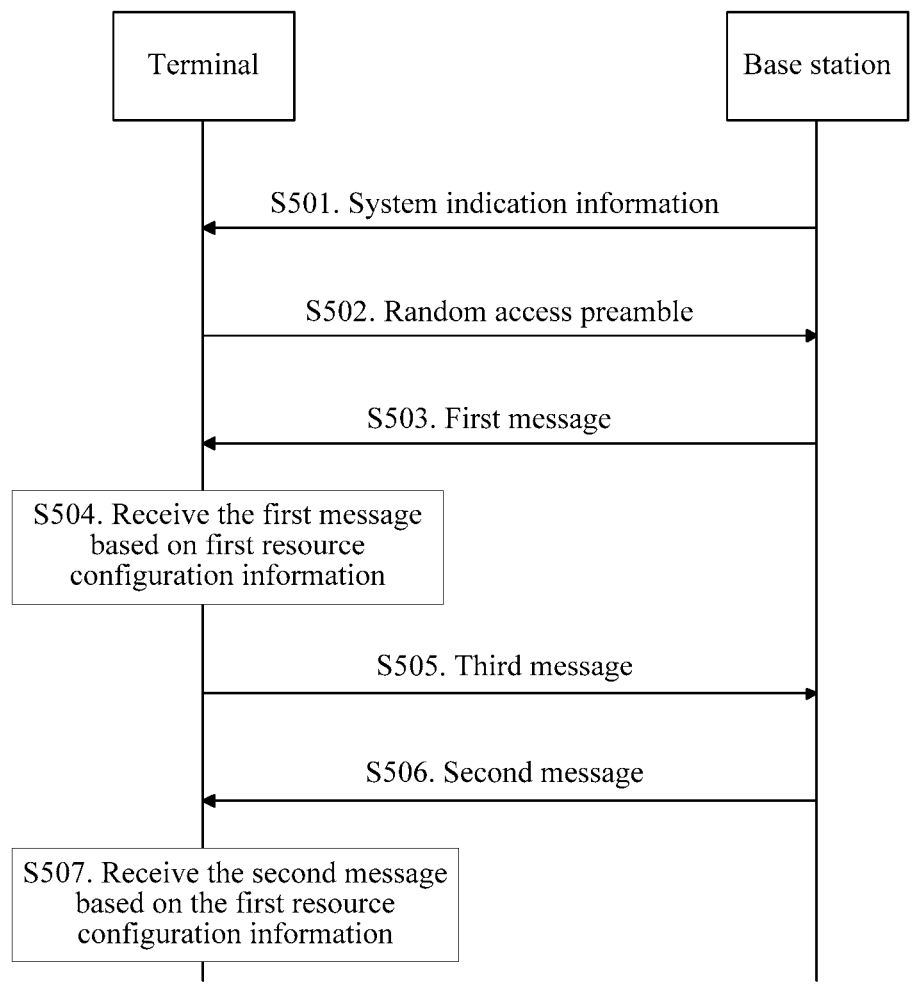
FIG. 5 is a flowchart of another information transmission method according to an embodiment of this application.

As shown in FIG. 5, in a possible implementation of this embodiment of this application, the method includes the following steps.

S501. A base station sends system indication information to a terminal.

Correspondingly, the terminal receives the system indication information from the base station.

The system indication information includes first resource configuration information.

For explanations of the first resource configuration information, refer to related descriptions in step S401. Details are not described herein again.

S502. The terminal sends a random access preamble to the base station.

Correspondingly, the base station receives the random access preamble from the terminal.

S503. The base station sends a first message to the terminal.

S504. The terminal receives the first message based on the first resource configuration information.

Optionally, if downlink control information indicated by the first resource configuration information does not include information about a transmission resource used to transmit the first message, or the first resource configuration information does not indicate a transmission resource of downlink control information corresponding to the first message, the terminal receives the first message based on an existing method for receiving a random access response message by a terminal in a random access procedure.

S505. The terminal sends a third message to the base station.

Correspondingly, the base station receives the third message from the terminal.

S506. The base station sends a second message to the terminal.

S507. The terminal receives the second message based on the first resource configuration information.

For implementations of step S503, step S504, step S506, and step S507, refer to the descriptions in the embodiment corresponding to FIG. 4. Details are not described herein again.

It may be understood that the terminal or the network side device can perform some or all steps in the foregoing embodiment. These steps or operations are merely examples. In this embodiment of this application, another operation or various variants of the operations may alternatively be performed. In addition, the steps may be performed in an order different from that presented in the foregoing embodiment, and the operations in the foregoing embodiment may not need to be all performed.

Figure 6:
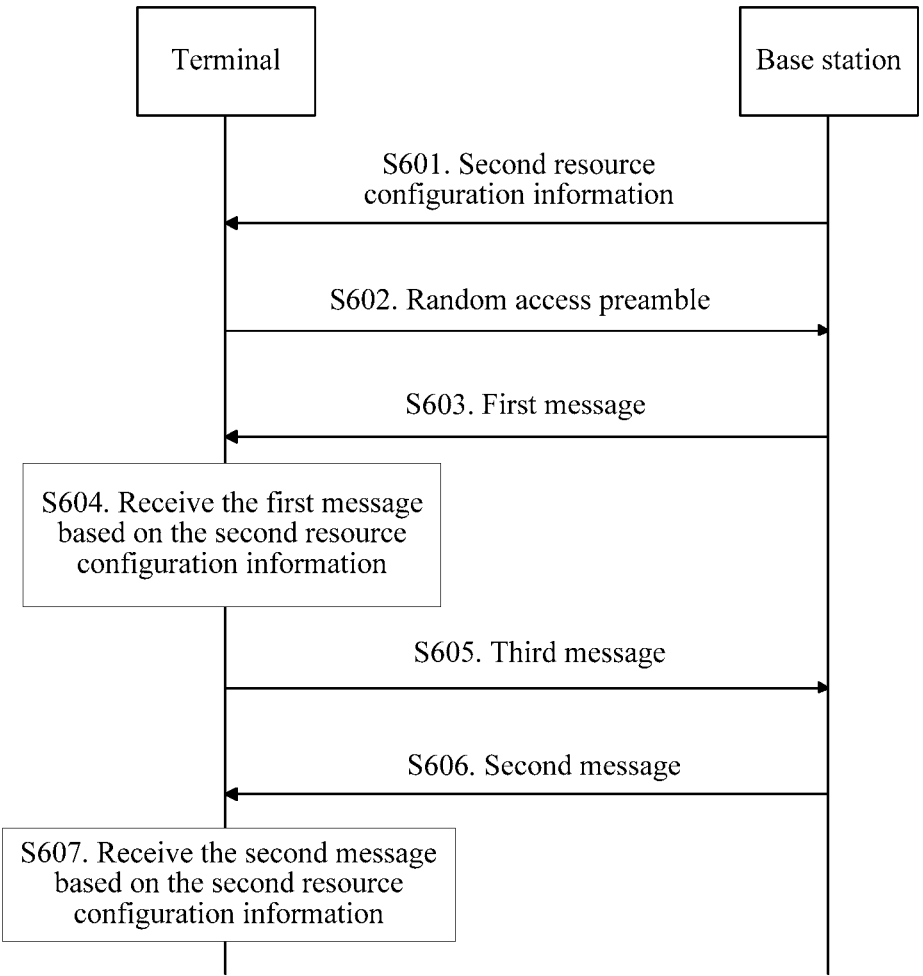
FIG. 6 is a flowchart of another information transmission method according to an embodiment of this application.

As shown in FIG. 6, it may be understood that, in another implementable solution, the method includes the following steps.

S601. A base station sends second resource configuration information to a terminal.

Correspondingly, the terminal receives the second resource configuration information.

The second resource configuration information is used to indicate a transmission resource of system indication information. Optionally, the base station may add the second resource configuration information to a MIB or EMSI sent to the terminal, and the system indication information may be a SIB 1 or RMSI. In other words, the second resource configuration information in the MIB or the EMSI may indicate a transmission resource of the SIB 1 or the RMSI.

The base station may send the system indication information to the terminal based on the second resource configuration information, and the system indication information may be the SIB 1, the RMSI, or another system message. Further, the terminal may receive the system indication information based on the second resource configuration information.

Optionally, the system indication information may include first resource configuration information.

Optionally, the base station may further send first indication information. The first indication information is used to indicate whether the first resource configuration information is the same as the second resource configuration information, or is used to indicate whether the system indication information carries the first resource configuration information. Alternatively, it may be predefined that, when the base station does not send the first indication information to the terminal and the system indication information does not carry the first resource configuration information, it is considered by default that the second resource configuration information is the same as the first resource configuration information.

Optionally, the first indication information may be included in the MIB, the EMSI, or another system message. It may be understood that, when the first indication information indicates that the first resource configuration information is the same as the second resource configuration information, to be specific, the second resource configuration information is used to indicate not only the transmission resource of the system indication information but also a transmission resource of downlink control information, the base station only needs to send the second resource configuration information and the first indication information by using the MIB or the EMSI. The terminal determines, based on the received second resource configuration information and first indication information, that the second resource configuration information is the first resource configuration information. In this case, the terminal receiving the second resource configuration information may be understood as receiving the first resource configuration information.

Alternatively, the first indication information may be included in the SIB 1, the RMSI, or the another system message. The terminal first receives the second resource configuration information, then receives the SIB 1 or the RMSI based on the second resource configuration information, and further obtains the first indication information from the SIB 1 or the RMSI. If the first indication information indicates that the first resource configuration information is the same as the second resource configuration information, or indicates that the system indication information does not carry the first resource configuration information, the terminal determines that the second resource configuration information is the first resource configuration information. In this case, the terminal receiving the second resource configuration information may be understood as receiving the first resource configuration information.

If the first indication information indicates that the first resource configuration information is different from the second resource configuration information, or indicates that the system indication information carries the first resource configuration information, this is the same as the case in the embodiment corresponding to FIG. 4, and the terminal receives a first message and/or a second message based on the first resource configuration information carried in the system indication information.

It may be understood that the first indication information is not mandatory.

Optionally, when the base station does not send the first indication information to the terminal and the system indication information does not carry the first resource configuration information, the base station only needs to send the second resource configuration information by using the MIB or the EMSI, and the terminal determines by default, based on the received second resource configuration information, that the second resource configuration information is the first resource configuration information. In this case, the terminal receiving the second resource configuration information may be understood as receiving the first resource configuration information.

Descriptions are provided in the following step S602 to step S607 by using an example in which the terminal determines, based on the first indication information, that the second resource configuration information is the first resource configuration information.

Optionally, the first indication information may be indication information in the MIB, the SIB 1, or the another system message. For example, if the first indication information is "0", it indicates that the first resource configuration information is the same as the second resource configuration information, or indicates that the system indication information does not carry the first resource configuration information. If the first indication information is "1", it indicates that the first resource configuration information is different from the second resource configuration information, or indicates that the system indication information carries the first resource configuration information.

Figure 7:
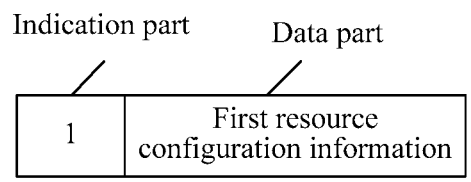
FIG. 7 is an example of a schematic diagram of a structure of system indication information according to an embodiment of this application.

As shown in FIG. 7, using an example in which the first indication information is one-bit indication information in the system indication information, the system indication information in FIG. 7 is divided into an indication part and a data part. "1" in the indication part indicates that the system indication information carries the first resource configuration information, and the data part carries the first resource configuration information. "One-bit" is merely used as an example. A size of a resource occupied by the indication information is not limited in this embodiment of this application.

It may be understood that, when the first resource configuration information is different from the second resource configuration information, the base station may not send the first indication information, in other words, the system indication information in FIG. 7 carries only the first resource configuration information.

It should be noted that, the second resource configuration information is used to indicate the transmission resource of the system indication information. It may be understood that, the second resource configuration information is used to indicate a transmission resource of a PDCCH of the system indication information, and downlink control information carried on the PDCCH of the system indication information is used to schedule a PDSCH carrying the system indication information.

S602. The terminal sends a random access preamble to the base station. Correspondingly, the base station receives the random access preamble from the terminal.

S603. The base station sends a first message to the terminal.

S604. The terminal receives the first message based on the second resource configuration information.

Because the first resource configuration information is the same as the second resource configuration information, the terminal receiving the first message based on the second resource configuration information may be understood as the terminal receiving the first message based on the first resource configuration information.

S605. The terminal sends a third message to the base station.

Correspondingly, the base station receives the third message from the terminal.

S606. The base station sends a second message to the terminal.

S607. The terminal receives the second message based on the second resource configuration information.

Because the first resource configuration information is the same as the second resource configuration information, the terminal receiving the second message based on the second resource configuration information may be understood as the terminal receiving the second message based on the first resource configuration information.

For implementations of step S603, step S604, step S606, and step S607, refer to the descriptions in the embodiment corresponding to FIG. 4, and details are not described herein again.

It may be understood that the terminal or the network side device can perform some or all steps in the foregoing embodiment. These steps or operations are merely examples. In this embodiment of this application, another operation or various variants of the operations may alternatively be performed. In addition, the steps may be performed in an order different from that presented in the foregoing embodiment, and the operations in the foregoing embodiment may not need to be all performed.

Optionally, in another implementation of this embodiment of this application, it may be predefined in a protocol that the first resource configuration information is the same as a resource for receiving the system indication information (the SIB 1 or the RMSI). To be specific, before a random access process, the base station sends the EMSI or the MIB to the terminal. The EMSI or the MIB sent by the base station carries control resource set (Control Resource Set, CORE-SET) configuration information. The terminal receives the system indication information based on the CORESET configuration information. In the random access process, the terminal receives the first message and/or the second message by using the CORESET configuration information by default. Optionally, a transmission resource that is of downlink control information and that is indicated by the first resource configuration information is a CORESET, and the CORESET configuration information is information used to indicate the transmission resource.

It may be understood that these steps or operations in the foregoing embodiments are merely examples. In the embodiments of this application, another operation or various variants of the operations may alternatively be performed. In addition, the steps may be performed in an order different from that presented in the foregoing embodiments, and the operations in the foregoing embodiments may not need to be all performed.

Based on the foregoing embodiments, a manner of sending the first resource configuration information is described below by using examples.

(1) Optionally, the base station may send an index of first resource configuration information to the terminal. Correspondingly, the terminal receives the index of the first resource configuration information, and determines the first resource configuration information corresponding to the index of the first resource configuration information.

The terminal stores a correspondence between indexes and first resource configuration information. For example, Table 1 may be referenced.

If the first resource configuration information separately indicates a transmission resource of downlink control information corresponding to the first message and a transmission resource of downlink control information corresponding to the second message, when the transmission resource of the downlink control information corresponding to the first message is different from the transmission resource of the downlink control information corresponding to the second message, the transmission resource of the downlink control information corresponding to the first message and/or the transmission resource of the downlink control information corresponding to the second message may be separately indicated by using two tables including different parameters.

(2) Optionally, before the random access process, the base station may notify the terminal of an available random access preamble resource. The base station may add the random access preamble resource available to the terminal to the MIB, the SIB 1, the EMSI, or the RMSI, and optionally, may add the random access preamble resource to the first resource configuration information. The random access preamble resource includes at least one of a time-domain and/or frequency-domain resource of a physical random access control channel (PRACH), a preamble index (preamble ID), and a preamble format.

In a possible implementation, the base station may group random access preamble resources into two groups, for example, may group preamble indexes into two groups. A

TABLE 1

| | First resource configuration information | | | | | |
|---|---|---|---|---|---|---|
| Index of first resource configuration information | Frequency domain position of a PDCCH carrying downlink control information | Time domain position of the PDCCH carrying the downlink control information | Sequence number of a start OFDM symbol | Monitoring duration (ms) | Monitoring cycle | Transmission type |
| 1 | X | Y | M | N | T | Interleaving |
| 2 | X + 1 | Y + 1 | M + 1 | N + 1 | 2T | Interleaving |
| 3 | X + 2 | Y + 2 | M + 2 | N + 2 | 3T | Non-interleaving |
| 4 | X + 3 | Y + 3 | M + 3 | N + 3 | 4T | Non-interleaving |
| 5 | X + 4 | Y + 4 | M + 4 | N + 4 | 5T | Interleaving |

It should be noted that, the first resource configuration information may include any one or more of a frequency domain position of a PDCCH carrying the downlink control information, a time domain position of the PDCCH carrying downlink control information, a sequence number of a start OFDM symbol, monitoring duration, a monitoring cycle, and a transmission type that are shown in Table 1.

Referring to Table. 1, if the index that is of the first resource configuration information and that is received by the terminal is 1, a resource corresponding to the index being 1 may be found based on Table 1, and the resource corresponding to the index being 1 is the transmission resource of the downlink control information.

Optionally, if the first resource configuration information indicates a transmission resource of one type of downlink control information, and the downlink control information includes information used to indicate a transmission resource of the first message and/or information used to indicate a transmission resource of the second message, the first resource configuration information in Table 1 indicates both a transmission resource of downlink control information corresponding to the first message and a transmission resource of downlink control information corresponding to the second message.

first group includes a preamble index 1 to a preamble index 10, and a second group includes a preamble index 11 to a preamble index 64. Corresponding to the two groups of the random access preamble resources, content indicated by the first resource configuration information may be classified into the following three cases.

Case 1: If the available random access preamble index notified by the base station to the terminal belongs to the first group, the first resource configuration information is used to instruct the terminal to receive the first message based on a RAR window and receive the second message based on a contention resolution time window.

Optionally, if the available preamble index notified by the base station to the terminal belongs to the first group, the base station may not send the first resource configuration information to the terminal. If the terminal does not receive the first resource configuration information, the terminal receives the first message based on a RAR window and receives the second message based on a contention resolution time window by default.

Case 2: If the available preamble index notified by the base station to the terminal belongs to the second group, the first resource configuration information is the same as the first resource configuration information described in the embodiment corresponding to FIG. 4.

Case 3: If the available preamble index notified by the base station to the terminal belongs to the second group, the base station sends a correspondence between terminal information and first resource configuration information to the terminal. For example, the correspondence between terminal information and first resource configuration information is shown in Table 2. One row in Table 2 represents one correspondence. This may be understood as that the base station sends a plurality of correspondences to the terminal, and each correspondence includes one piece of first resource configuration information. After receiving the correspondence between terminal information and first resource configuration information, the terminal may search for first resource configuration information corresponding to terminal information of the terminal, and further receive the first message and/or the second message based on the first resource configuration information.

Optionally, the base station may not send a correspondence between terminal information and first resource configuration information to the terminal, and the terminal pre-stores the correspondence between terminal information and first resource configuration information. For example, the terminal pre-stores Table 2. Before receiving the first message and/or the second message, the terminal may search the pre-stored correspondence between terminal information and first resource configuration information for first resource configuration information corresponding to terminal information of the terminal, and further receive the first message and/or the second message based on the first resource configuration information. In this case, the base station may not send the first resource configuration information to the terminal.

The terminal information includes at least one of the following information: a time-frequency resource of a PRACH, a preamble index, a preamble format, an air interface access technology (numerology) parameter, and a service type.

The numerology parameter includes at least one of the following information: subcarrier spacing, a transmission time interval (TTI) length, a cyclic prefix (CP) length, transmission bandwidth, and a quantity of OFDM symbols in each slot.

TABLE 2

| First resource configuration information | | | | | |
|---|---|---|---|---|---|
| Frequency domain position of a PDCCH carrying downlink control information | Time domain position of the PDCCH carrying the downlink control information | Sequence number of a start OFDM symbol | Monitoring duration (ms) | Monitoring cycle | Transmission type |
| X | Y | M | N | T | Interleaving |
| X + 1 | Y + 1 | M + 1 | N + 1 | 2T | Interleaving |
| X + 2 | Y + 2 | M + 2 | N + 2 | 3T | Non-interleaving |
| X + 3 | Y + 3 | M + 3 | N + 3 | 4T | Non-interleaving |
| X + 4 | Y + 4 | M + 4 | N + 4 | 5T | Interleaving |

| Terminal information | | | | |
|---|---|---|---|---|
| Time-frequency resource of a RACH | Preamble index | Preamble format | Numerology | Service type |
| (1, 1) | 1, 2, 3, 4 | (1, 3) | Type 1 | URLLC |
| (1, 1) | 6, 7 | (1, 3) | Type 2 | eMBB |
| (1, 1) | 8, 9 | (1, 3) | Type 3 | URLLC |
| (1, 2) | 10, 11 | (1, 3) | Type 4 | eMBB |
| (2, 1) | 12 | (1, 3) | Type 5 | URLLC |

It should be noted that, Table 2 is merely an example. The first resource configuration information may include any one or more items shown in Table 2, and the terminal information may include any one or more items shown in Table 2.

Optionally, the terminal may alternatively store a table of a correspondence between an index of first resource configuration information, first resource configuration information, and terminal information, as shown in Table 3.

TABLE 3

| | First resource configuration information | | | | | |
|---|---|---|---|---|---|---|
| Index of first resource configuration information | Frequency domain position of a PDCCH carrying downlink control information | Time domain position of the PDCCH carrying the downlink control information | Sequence number of a start OFDM symbol | Monitoring duration (ms) | Monitoring cycle | Transmission type |
| 1 | X | Y | M | N | T | Interleaving |
| 2 | X + 1 | Y + 1 | M + 1 | N + 1 | 2T | Interleaving |

TABLE 3-continued

| 3 | X + 2 | Y + 2 | M + 2 | N + 2 | 3T | Non-interleaving |
| 4 | X + 3 | Y + 3 | M + 3 | N + 3 | 4T | Non-interleaving |
| 5 | X + 4 | Y + 4 | M + 4 | N + 4 | 5T | Interleaving |

| Index of first resource configuration information | Terminal information ||||| 
|---|---|---|---|---|---|
| | RACH time-frequency resource | Preamble index | Preamble format | Numerology | Service type |
| 1 | (1, 1) | 1, 2, 3, 4 | (1, 3) | Type 1 | URLLC |
| 2 | (1, 1) | 6, 7 | (1, 3) | Type 2 | eMBB |
| 3 | (1, 1) | 8, 9 | (1, 3) | Type 3 | URLLC |
| 4 | (1, 2) | 10, 11 | (1, 3) | Type 4 | eMBB |
| 5 | (2, 1) | 12 | (1, 3) | Type 5 | URLLC |

The random access processes in the foregoing embodiments are all contention access processes. When a random access process is non-contention access, the base station may designate a PRACH resource for the terminal. The PRACH resource includes a PRACH time-domain resource and a preamble resource.

In an LTE system, the base station may send a PRACH mask index to the terminal to designate the PRACH time-domain resource, and send a preamble ID to the terminal to designate a preamble to be used by the terminal in the non-contention random access process.

In an NR system, the base station may allocate different preamble IDs to the terminal on different PRACH resources. Specifically, the base station may send a notification message. The notification message is used to notify the terminal of a quantity of PRACH time-frequency resources or a quantity of preamble IDs, or notify the terminal of a quantity of preamble sending times.

Content of the notification message may be n (the quantity of preamble sending times of the terminal) and {PRACH MASK Index, Preamble ID} corresponding to each preamble sending time. The PRACH MASK Index is a parameter (which may be, for example, an index number of the PRACH time-frequency resource) used to designate the PRACH time-frequency resource. The Preamble ID is a parameter (which may be, for example, an index number of the preamble) used to designate the preamble in the non-contention random access.

In an implementable solution, in the random access process, the terminal sends the random access preamble to the base station. After the base station sends a random access response message to the terminal based on the random access preamble, the random access process may further include the following step 1 and step 2.

Step 1. The terminal sends a third message to the base station. Correspondingly, the base station receives the third message.

The terminal may be a terminal in an idle state, a terminal in a third state, a terminal in an inactive state, or a terminal failing to send a radio link. It may be understood that the third message may be any one of a radio resource control recovery request, a radio resource control reestablishment request, and a radio resource control reactivation request.

Step 2. The base station sends a resource message of the third message to the terminal over a common control channel (CCCH) or a dedicated control channel (DCCH).

Correspondingly, the terminal simultaneously monitors the CCCH and the DCCH.

Optionally, the terminal may receive the response message of the third message by using the first resource configuration information. For a method for receiving the response message of the third message, refer to the method for receiving the second message that is described in the foregoing embodiment.

If the terminal receives data or signaling from the CCCH, the terminal does not perform a decryption action on the data or the signaling, in other words, the terminal considers that the data or the signaling is not encrypted. If the terminal receives data or signaling from the DCCH, the terminal decrypts the data or the signaling, in other words, the terminal considers that the data or the signaling is encrypted. For example, the terminal receives response signaling on the CCCH, and the terminal does not need to decrypt the signaling, in other words, the terminal considers that the signaling is not encrypted. For example, the response signaling is RRC response signaling carried on a signaling radio bearer (SRB) 0, and the SRB 0 is carried on the CCCH. The terminal receives response signaling on the DCCH, and the terminal decrypts the signaling, in other words, the terminal considers that the signaling is encrypted. For example, the response signaling is RRC response signaling carried on an SRB 1, and the SRB 1 is carried on the DCCH.

Figure 8:
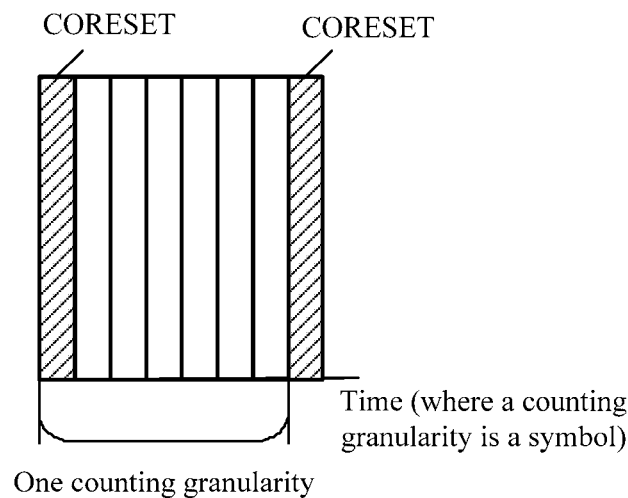
FIG. 8 is an example of a schematic diagram of using a CORESET as a counting granularity according to an embodiment of this application.

Optionally, an embodiment of this application further provides a message receiving method applicable to scenarios in the foregoing embodiments. However, the message receiving method is not limited to the scenarios in the foregoing embodiments, and is also applicable to a scenario of receiving a message based on a window. A reception time window of a first message may be referred to as a RAR window, and a reception time window of a second message may be referred to as a contention resolution time window. Counting granularities of the RAR window and the contention resolution time window may be a symbol, a slot, or a CORESET in a time domain dimension. If the symbol is used as the counting granularity, one counting granularity is a time of one symbol. If the slot is used as the counting granularity, one counting granularity is duration from the first symbol included in the slot to the last symbol included in the slot. If the CORESET in the time domain dimension is used as the counting granularity, as shown in FIG. 8, one vertical grid in FIG. 8 represents one symbol, a shadow vertical grid is a CORESET, and one counting granularity includes duration from the first symbol of one CORESET to a symbol previous to the next CORESET.

Optionally, a counting granularity of a monitoring window of a single cell point-to-multipoint (SC-PTM) message may also be a symbol, a slot, or a CORESET in the time domain dimension. The CORESET is a transmission resource corresponding to downlink control information used to schedule the SC-PTM message. For example, the CORESET includes a time-frequency resource of a PDCCH, and the PDCCH may indicate a PDSCH used to carry the SC-PTM message.

Optionally, a counting granularity of a monitoring window of on-demand system information (on demand SI, OSI) may be a symbol, a slot, or a CORESET in the time domain dimension. The CORESET is a transmission resource corresponding to downlink control information used to schedule the OSI. For example, the CORESET includes a time-frequency resource of a PDCCH, and the PDCCH may indicate a PDSCH used to carry the OSI.

When the terminal receives a message (where the message may be referred to as a message A), a scenario in which a start time point or an end time point of a reception time window of the message A is located in one CORESET that is in the time domain dimension and that corresponds to the message A. That is, an intersection set between a reception time window of the message A and one CORESET that is in the time domain dimension and that corresponds to the message A is not a complete CORESET in the time domain dimension. A solution for receiving the message A is provided for this scenario in the following embodiment of this application.

It may be understood that, the message A may be the first message or the second message in the foregoing embodiment, or may be an SC-PTM message or OSI.

The CORESET corresponding to the message A is a transmission resource corresponding to downlink control information used to schedule the message A. For example, the CORESET may include a time-frequency resource of a PDCCH, and the PDCCH may indicate a PDSCH used to carry the message A.

For a scenario in which the message A is the first message or the second message, the CORESET corresponding to the first message or the second message may be indicated in the manner in the foregoing embodiment, that is, by using first resource configuration information, or may be indicated in another manner. This is not limited in this embodiment of this application.

Figure 9:
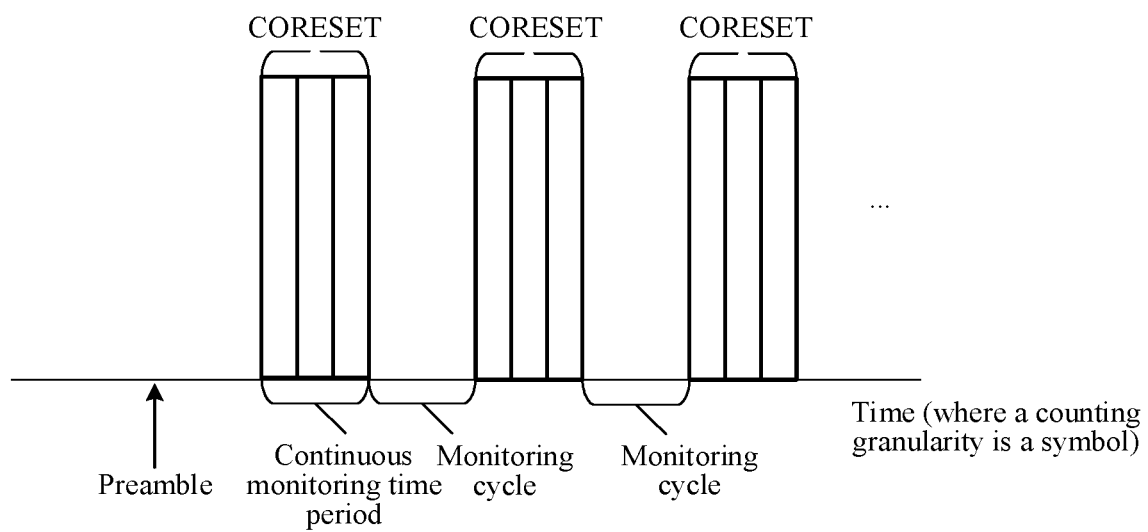
FIG. 9 is an example of a schematic diagram of monitoring duration and a monitoring cycle that are indicated by first resource configuration information according to an embodiment of this application.

For example, the first resource configuration information in the foregoing embodiment is used to indicate a CORESET used to carry the downlink control information. In time domain, the first resource configuration information may include a start OFDM symbol, monitoring duration, and a monitoring cycle of the CORESET. When the CORESET in the time domain dimension is used as the counting granularity, as shown in FIG. 9, a time period corresponding to one CORESET in the time domain dimension is one continuous monitoring time period. A start symbol location and an end symbol location of one CORESET may be determined based on the start OFDM symbol and the monitoring duration. Then a start symbol location and an end symbol location of subsequent another CORESET may be determined based on the monitoring cycle.

For a scenario in which the message A is an SC-PTM message or OSI, a CORESET corresponding to the SC-PTM message or the OSI may be indicated by using a system message. The CORESET corresponding to the SC-PTM message or the OSI may be different from or may be the same as the CORESET corresponding to the first message or the second message. This is not limited in this embodiment of this application.

The being located in one CORESET corresponding to the message A means that the intersection set between the reception time window of the message A and the CORESET that is in the time domain dimension and that corresponds to the message A is not a complete CORESET in the time domain dimension. That a start time point or an end time point of a reception time window of the message A is located in one CORESET that is in a time domain dimension and that corresponds to the message A does not include a case in which the start time point of the reception time window of the message A is the same as a start time point or an end time point of the CORESET in the time domain dimension.

In this embodiment of this application, that the CORESET is located in the reception time window of the message A means that the CORESET is located in the reception time window of the message A in the time domain dimension.

A method for receiving the message A in various scenarios is described below.

Scenario 1: The start time point of the reception time window of the message A is located in a continuous time period of one CORESET in the time domain dimension (where a start time point of the RAR window is located in one CORESET in the time domain dimension).

The continuous time period of the one CORESET in the time domain dimension may be referred to as a first continuous monitoring time period.

Specifically, for example, if the start time point of the reception time window of the message A is located in the first continuous monitoring time period, the message A may be received in one of the following manners:

The downlink control information corresponding to the message A is received on a CORESET part corresponding to an overlapping time period between the first continuous monitoring time period and the reception time window of the message A. In addition, the downlink control information corresponding to the message A may alternatively be received on another complete CORESET located in the reception time window of the message A.

Alternatively, the downlink control information corresponding to the message A is received on a CORESET corresponding to the first continuous monitoring time period. In addition, the downlink control information corresponding to the message A may alternatively be received on another complete CORESET located in the reception time window of the message A.

Alternatively, the downlink control information corresponding to the message A is received on another complete CORESET located in the reception time window of the message A. In other words, the downlink control information corresponding to the message A is not received on a CORESET corresponding to the first continuous monitoring time period.

Figure 10:
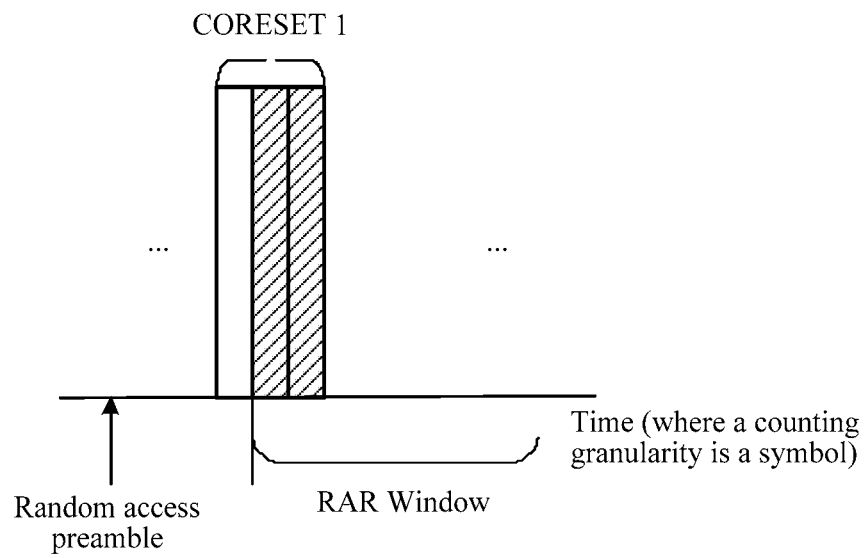
FIG. 10 is an example of a schematic diagram of a method for receiving a first message according to an embodiment of this application.

The first message, namely, the RAR message, is used as an example. As shown in FIG. 10, the start time point of the RAR window is located in a CORESET (CORESET 1). In this case, the terminal may receive a random access response message on an overlapping area (a shadow part in FIG. 10) between the RAR window and the CORESET 1 and a CORESET included in the RAR window.

Alternatively, the terminal receives a random access response message on the entire CORESET 1 and a CORESET included in the RAR window.

Alternatively, the terminal does not receive the first message on the CORESET 1, and receives the random access response message only on a CORESET included in the RAR window. In other words, the terminal does not receive, on the CORESET 1, the downlink control information corresponding to the first message.

Scenario 2: The end time point of the reception time window of the message A is located in a continuous time period of one CORESET in the time domain dimension (where an endtime point of the RAR window is located in one CORESET in the time domain dimension).

The continuous time period of the one CORESET in the time domain dimension may be referred to as a second continuous monitoring time period.

Specifically, for example, if the end time point of the reception time window of the message A is located in the second continuous monitoring time period, the message A may be received in one of the following manners.

The downlink control information corresponding to the message A is received on a CORESET part corresponding to an overlapping time period between the second continuous monitoring time period and the reception time window of the message A. In addition, the downlink control information corresponding to the message A may alternatively be received on another complete CORESET located in the reception time window of the message A.

Alternatively, the downlink control information corresponding to the message A is received on a CORESET corresponding to the second continuous monitoring time period. In addition, the downlink control information corresponding to the message A may alternatively be received on another complete CORESET located in the reception time window of the message A.

Alternatively, the downlink control information corresponding to the message A is received on another complete CORESET in the reception time window of the message A. In other words, the downlink control information corresponding to the message A is not received on the CORESET corresponding to the second continuous monitoring time period.

Figure 11:
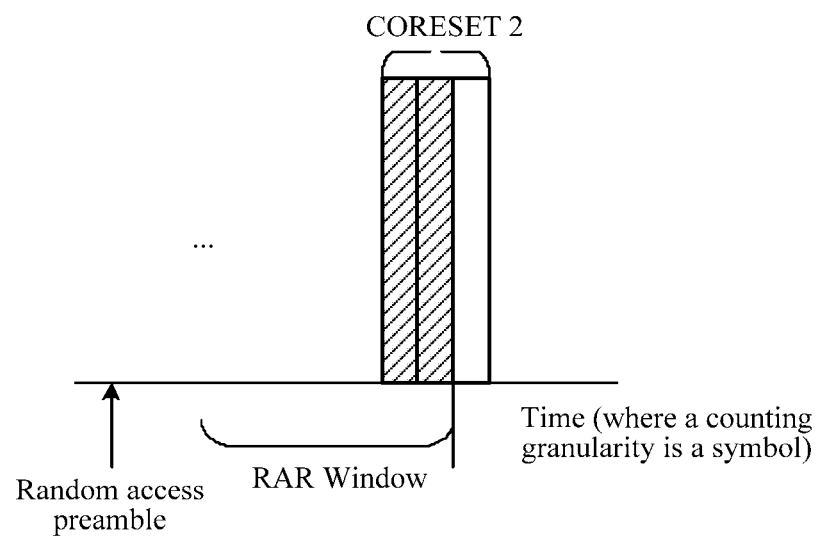
FIG. 11 is an example of a schematic diagram of another method for receiving a first message according to an embodiment of this application.

The first message, namely, the RAR message, is used as an example. As shown in FIG. 11, the end time point of the RAR window is located in a CORESET (CORESET 2). In this case, the terminal may receive a random access response message on an overlapping area (a shadow part in FIG. 11) between the RAR window and the CORESET 2 and a CORESET included in the RAR window.

Alternatively, the terminal receives a random access response message on the entire CORESET 2 and a CORESET included in the RAR window.

Alternatively, the terminal does not receive a random access response message on the CORESET 2, and receives the random access response message only on a CORESET included in the RAR window. In other words, the terminal does not receive, on the CORESET 2, the downlink control information corresponding to the first message.

Optionally, the base station may alternatively send a radio resource control (RRC) message (for example, a MIB, a SIB 1, EMSI, or RMSI) to the terminal to notify the terminal of a manner selected to receive the first message if the start time point and/or the end time point of the reception time window of the message A is located in the continuous time period of the one CORESET in the time domain dimension.

Figure 12:
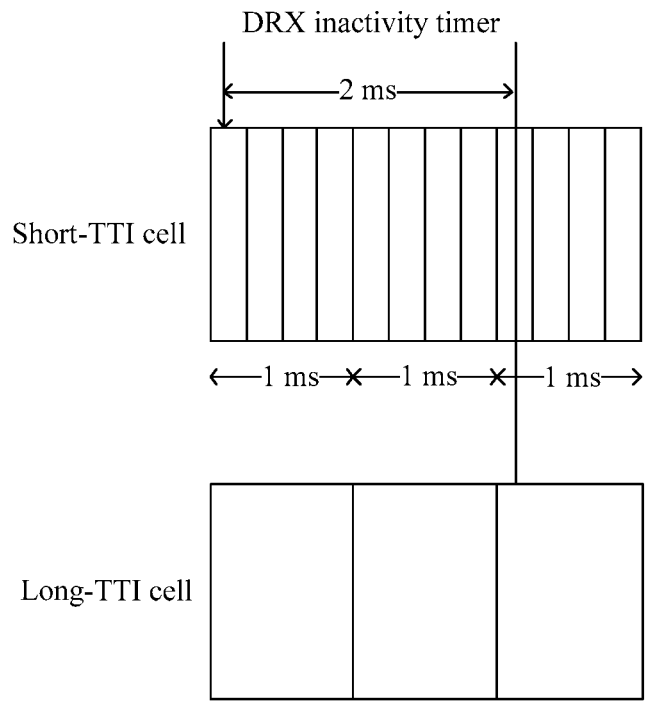
FIG. 12 is an example of a schematic diagram of a DCI monitoring method according to an embodiment of this application.

In an embodiment of this application, a method for monitoring downlink control information by a terminal is further described. In a carrier aggregation (CA) scenario, the terminal processes, by using a media access control (MAC) entity, data received or to be sent on all serving cells. Therefore, a discontinuous reception (DRX) status of the terminal needs to remain consistent on the serving cells at a same time point. In an LTE system, all the serving cells of the terminal use TTIs having a same length. In an NR system, different serving cells may use different TTIs. For example, as shown in FIG. 12, one vertical grid represents one TTI, one long TTI is 1 ms, and a time length of one long TTI is the same as time lengths of four short TTIs. It may be understood that the time length of the long TTI or the time length of the short TTI may be another value. This is not limited in this embodiment of this application.

For ease of description, a serving cell using the short TTI is referred to as a short-TTI cell, and a serving cell using the long TTI is referred to as a long-TTI cell.

During running of an on duration timer, the terminal monitors, on the short-TTI cell, downlink control information indicating new data, and enables a DRX inactivity timer. An end time point of a time window of the DRX inactivity timer may be located in a TTI of the long-TTI cell. If a processing method in the LTE system is still used, after the end time point of the time window of the DRX inactivity timer, the terminal falls in a standby state in a subsequent TTI (for example, the last three TTIs in FIG. 12) of the short-TTI cell, and the terminal is still in an active state in the TTI of the long-TTI cell. This causes inconsistency in the DRX status of the terminal on different serving cells.

Any one of the following manners may be used to ensure that the DRX status of the terminal is consistent on different serving cells:

(a) When the terminal monitors, on any serving cell, DCI indicating new data (or when another event that can enable/re-enable the DRX inactivity timer occurs), if the end time point of the time window of the DRX inactivity timer is located in a TTI of another serving cell, the terminal remains in a DRX active time until the TTI of the another serving cell ends. This may alternatively be understood as that the terminal remains in the DRX active time until the TTI that is of the another serving cell and that includes the end time point of the time window of the DRX inactivity timer ends. For example, referring to FIG. 12, the terminal remains in a DRX active state until the last TTI of the long-TTI cell ends. In other words, the terminal is in the DRX active state in the last three TTIs of the short-TTI cell in FIG. 12.

Figure 13:
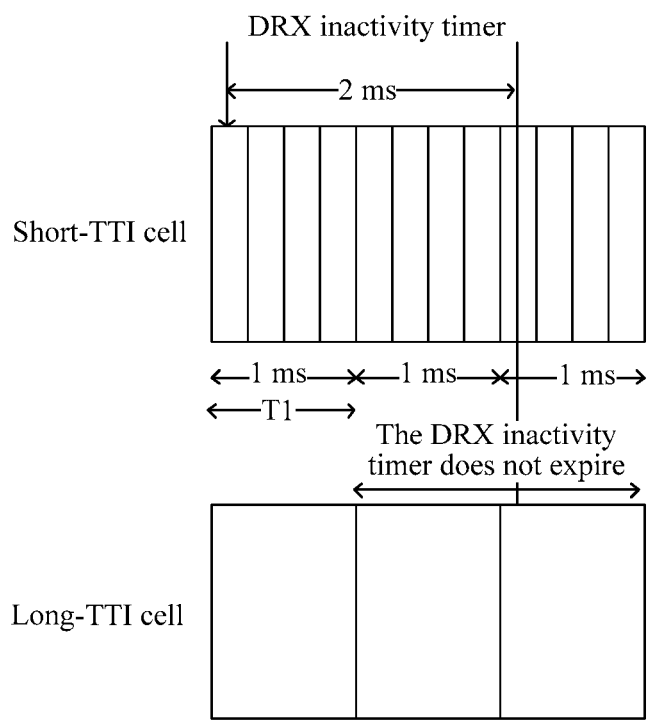
FIG. 13 is an example of a schematic diagram of another DCI monitoring method according to an embodiment of this application.

(b) When the terminal monitors, on any serving cell, DCI indicating new data (or when another event that can enable/re-enable the DRX inactivity timer occurs), the DRX inactivity timer may start to be enabled in a next TTI of a cell having a longest TTI. The next TTI of the cell having the longest TTI herein is a TTI next to a TTI in which the new downlink control information is monitored. For example, as shown in FIG. 13, if the terminal monitors, in the first TTI of the short-TTI cell, the DCI indicating the new data, the terminal starts to enable the DRX inactivity timer in the second TTI of the long-TTI cell. In addition, it further needs to be ensured that the terminal is in the DRX active state in a time period T1 in FIG. 13. In other words, the on duration timer is in a running state in the time period T1.

Figure 14:
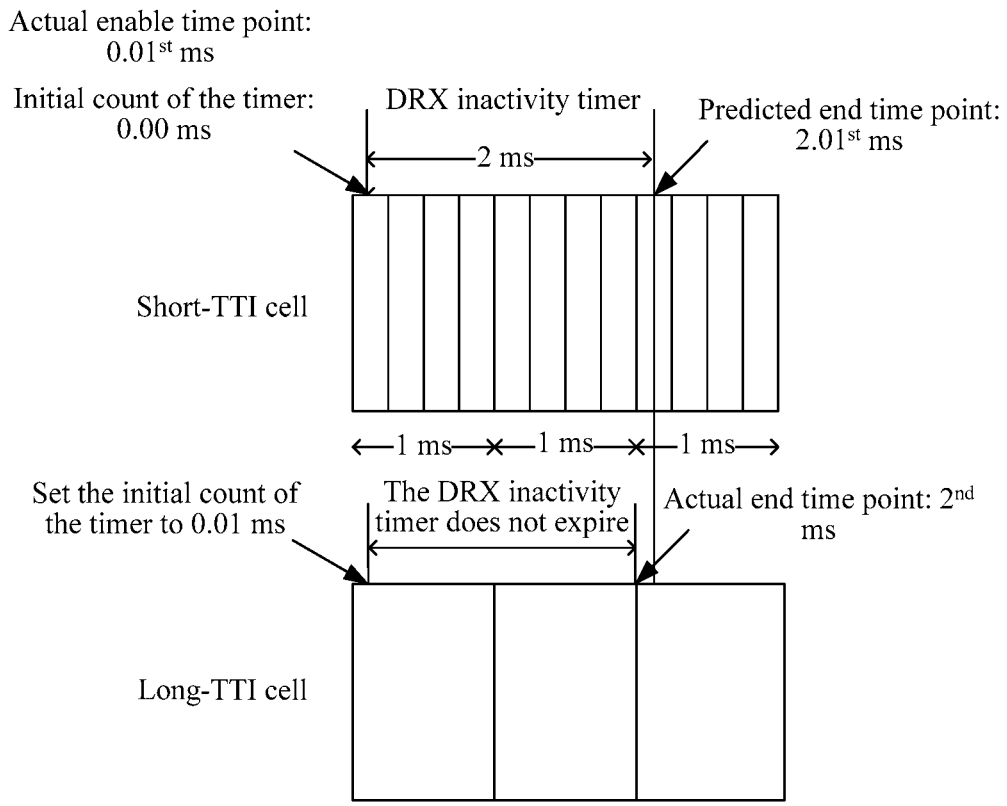
FIG. 14 is an example of a schematic diagram of another DCI monitoring method according to an embodiment of this application.

(c) When the terminal monitors, on any cell, DCI indicating new data (or another event that can enable/re-enable the DRX inactivity timer occurs), the DRX inactivity timer is enabled. However, an initial count of the DRX inactivity timer is set to be a time interval between a start time point of a current TTI of a cell having a longest TTI and that serves the terminal and a time point at which the DRX inactivity timer is enabled. For example, as shown in FIG. 14, if an actual time point at which the DRX inactivity timer is enabled is the $0.01^{st}$ ms, and duration of the DRX inactivity timer should be 2 ms, the end time point of the DRX inactivity timer should be the $2.01^{st}$ ms. Apparently, the $2.01^{st}$ ms is located in a TTI of a long TTI. In this embodiment of this application, the initial count when the DRX inactivity timer is enabled is set to be the time interval between the start time point of the current TTI of the long-TTI cell and the time point at which the DRX inactivity timer is enabled, namely, 0.01 ms. In this case, the end time point of the DRX inactivity timer is the $2^{nd}$ ms, and is the same as an end time point of the second TTI of the long-TTI cell. This avoids a case in which the end time point of the DRX inactivity timer falls within a specific TTI of the long-TTI cell, thereby ensuring the consistency in the DRX status of the terminal on the serving cells.

It should be noted that the information receiving methods described in the embodiments corresponding to FIG. 8 to FIG. 14 may be implemented based on the embodiments corresponding to FIG. 2 to FIG. 7, or may be independently implemented. This is not limited in this application.

The foregoing mainly describes the solutions provided in the embodiments of this application from a perspective of interaction between different network elements. It may be understood that, to implement the foregoing functions, the network side device and the terminal include corresponding hardware structures and/or software modules performing the functions. With reference to examples of units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of this application.

In an embodiment of this application, functional unit division may be performed on the network side device, the terminal, or the like based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that, in this embodiment of this application, unit division is an example, and is merely logical function division. In an actual implementation, another division manner may be used.

Figure 15:
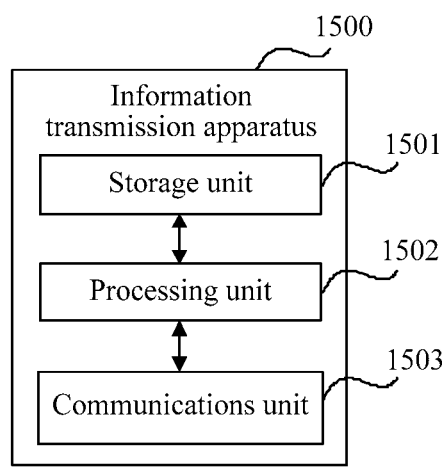
FIG. 15 is a schematic structural diagram of an information transmission apparatus according to an embodiment of this application.

FIG. 15 is a schematic block diagram of an information transmission apparatus according to an embodiment of this application. The apparatus 1500 may exist in a form of software, may be a terminal, or may be a chip applicable to a terminal. The apparatus 1500 includes a processing unit 1502 and a communications unit 1503. The processing unit 1502 is configured to control and manage actions of the apparatus 1500. For example, the processing unit 1502 is configured to support the apparatus 1500 in performing steps of receiving the downlink control information of the first message, receiving the first message based on the downlink control information of the first message, receiving the downlink control information of the second message, and receiving the second message based on the downlink control information of the second message in FIG. 4, step S504 and step S507 in FIG. 5, step S604 and step S607 in FIG. 6, and/or another process used for a technology described in this specification. The communications unit 1503 is configured to support the apparatus 1500 in communicating with another network element (for example, a network side device). The apparatus 1500 may further include a storage unit 1501, configured to store program code and data of the apparatus 1500.

The processing unit 1502 may be a processor or a controller, for example, may be a CPU, a general purpose processor, a DSP, an ASIC, an FPGA, another programmable logic device, a transistor logic device, a hardware component, or any combination thereof. The processing unit 1502 may implement or execute various examples of logical blocks, modules, and circuits described with reference to content disclosed in this application. Alternatively, the processor may be a combination for implementing a computing function, for example, a combination of one or more microprocessors, or a combination of the DSP and a microprocessor. The communications unit 1503 may be a transceiver, a transceiver circuit, a communications interface, or the like. The storage unit 1501 may be a memory.

Figure 16:
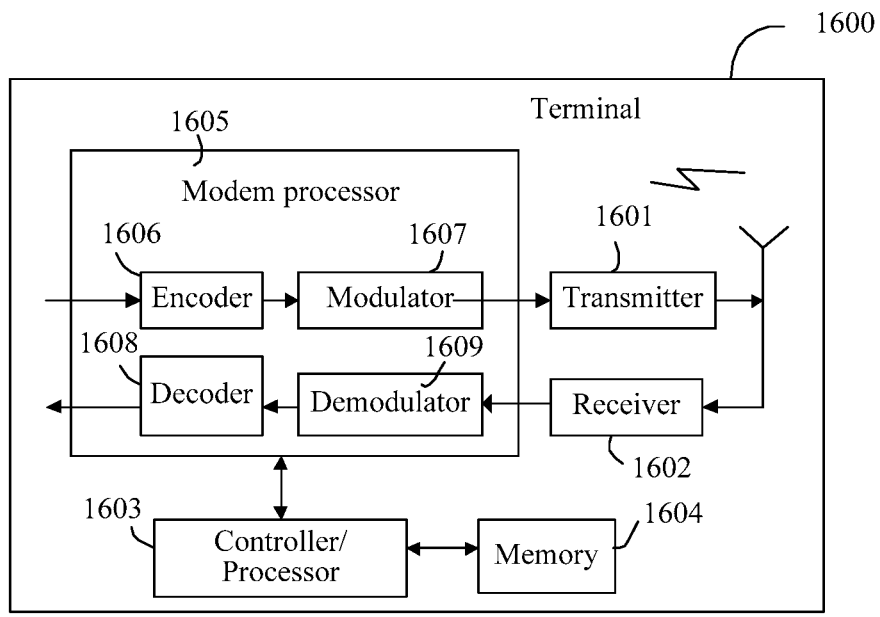
FIG. 16 is a schematic structural diagram of a terminal according to an embodiment of this application.

When the processing unit 1502 is a processor, the communications unit 1503 is a transceiver, and the storage unit 1501 is a memory, the terminal in this embodiment of this application may be a terminal shown in FIG. 16.

FIG. 16 is a simplified schematic diagram of a possible design structure of a terminal according to an embodiment of this application. The terminal 1600 includes a transmitter 1601, a receiver 1602, and a processor 1603. The processor 1603 may alternatively be a controller, and is indicated as a "controller/processor 1603" in FIG. 16. Optionally, the terminal 1600 may further include a modem processor 1605, where the modem processor 1605 may include an encoder 1606, a modulator 1607, a decoder 1608, and a demodulator 1609.

In an example, the transmitter 1601 adjusts (for example, performs analog conversion, filtering, amplification, and up-conversion on) output sampling and generates an uplink signal. The uplink signal is transmitted to the base station in the foregoing embodiment by using an antenna. On a downlink, the antenna receives a downlink signal transmitted by the base station in the foregoing embodiment. The receiver 1602 adjusts (for example, filters, amplifies, down-converts, and digitizes) the signal received from the antenna and provides input sampling. In the modem processor 1605, the encoder 1606 receives service data and a signaling message that are to be sent on an uplink, and processes (for example, formats, encodes, and interleaves) the service data and the signaling message. The modulator 1607 further processes (for example, performs symbol mapping on and modulates) encoded service data and an encoded signaling message, and provides output sampling. The demodulator 1609 processes (for example, demodulates) the input sampling and provides a symbol estimation. The decoder 1608 processes (for example, performs deinterleaving and decoding on) the symbol estimation and provides decoded data and a decoded signaling message that are to be sent to the terminal 1600. The encoder 1606, the modulator 1607, the demodulator 1609, and the decoder 1608 may be implemented by the combined modem processor 1605. These units perform processing based on a radio access technology (for example, access technologies of an LTE system and another evolved system) used in a radio access network. It should be noted that, when the terminal 1600 does not include the modem processor 1605, the foregoing function of the modem processor 1605 may alternatively be implemented by the processor 1603.

The processor 1603 controls and manages actions of the terminal 1600, to perform a processing process performed by the terminal 1600 in the foregoing embodiments of this application. For example, the processor 1603 is further configured to perform a processing process related to the terminal in the methods shown in FIG. 2 and FIG. 4 to FIG. 6 and/or another process of the technical solutions described in this application.

Further, the terminal 1600 may include a memory 1604. The memory 1604 is configured to store program code and data that are used for the terminal 1600.

Figure 17:
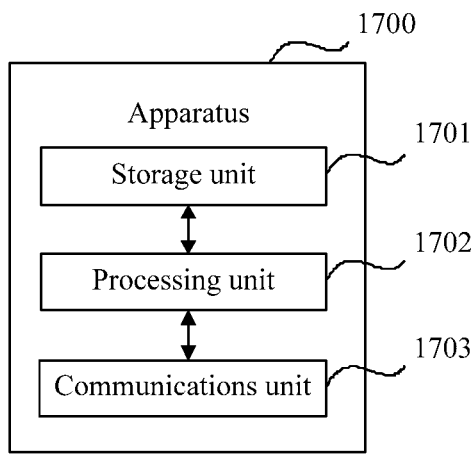
FIG. 17 is a schematic structural diagram of another information transmission apparatus according to an embodiment of this application.

FIG. 17 is an example of a possible block diagram of another information transmission apparatus according to an embodiment of this application. The apparatus 1700 may exist in a form of software, may be a network side device, for example, a base station, or may be a chip applicable to a network side device. The apparatus 1700 includes a processing unit 1702 and a communications unit 1703. The processing unit 1702 is configured to control and manage actions of the apparatus 1700. For example, the processing unit 1702 is configured to support the apparatus 1700 in performing step S202 and step S204 in FIG. 2, step S401 and step S402 in FIG. 4, step S501, step S503, and step S506 in FIG. 5, step S601, step S603, and step S606 in FIG. 6, and/or another process used for a technology described in this specification. The communications unit 1703 is configured to support the apparatus 1700 in communicating with another network entity (for example, a terminal). The apparatus 1700 may further include a storage unit 1701, configured to store program code and data of the apparatus 1700.

The processing unit 1702 may be a processor or a controller, for example, may be a CPU, a general purpose processor, a DSP, an ASIC, an FPGA, another programmable logic device, a transistor logic device, a hardware component, or any combination thereof. The processing unit 1702 may implement or execute various examples of logical blocks, modules, and circuits described with reference to content disclosed in this application. Alternatively, the processor may be a combination for implementing a computing function, for example, a combination of one or more microprocessors, or a combination of the DSP and a microprocessor. The communications unit 1703 may be a communications interface, a transceiver, a transceiver circuit, or the like. The communications interface is a general name. In a specific implementation, the communications interface may include a plurality of interfaces, for example, an interface between the base station and the terminal and/or another interface. The storage unit 1701 may be a memory.

Figure 18:
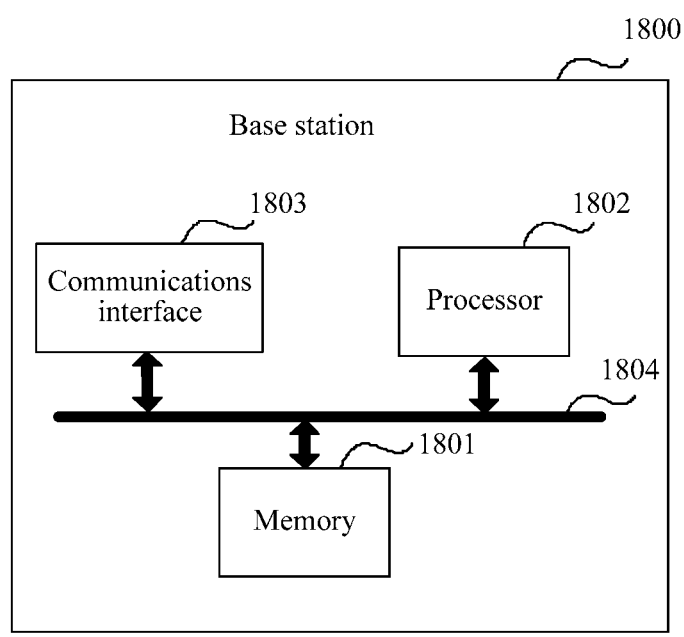
FIG. 18 is a schematic structural diagram of a base station according to an embodiment of this application.

When the processing unit 1702 is a processor, the communications unit 1703 is a communications interface, and the storage unit 1701 is a memory, the apparatus 1700 in this embodiment of this application may be a base station shown in FIG. 18.

Referring to FIG. 18, a base station 1800 includes a processor 1802, a communications interface 1803, and a memory 1801. Optionally, a base station 1800 may further include a bus 1804. The communications interface 1803, the processor 1802, and the memory 1801 may be connected to each other via the bus 1804. The bus 1804 may be a peripheral component interconnect (PCI for short) bus, an extended industry standard architecture (EISA for short) bus, or the like. The bus 1804 may be classified into an address bus, a data bus, a control bus, and the like. For ease of representation, only one thick line is used to represent the bus in FIG. 18, but this does not mean that there is only one bus or only one type of bus.

Methods or algorithm steps described with reference to the content disclosed in this application may be implemented in a form of hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and can write information into the storage medium. Certainly, the storage medium may be a component of the processor. The processor and the storage medium may be located in an ASIC. In addition, the ASIC may be located in a core network interface device. Certainly, the processor and the storage medium may alternatively exist in the core network interface device as discrete assemblies.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the functional units may exist alone, or two or more units may be integrated into one unit. The integrated unit may be implemented in a form of hardware, or may be implemented in a form of hardware in addition to a software functional unit.

Based on the foregoing descriptions of the implementations, a person skilled in the art may clearly understand that this application may be implemented by software in addition to necessary commodity hardware or by hardware only. In most circumstances, the former is a more desirable implementation. Based on such an understanding, the technical solutions of this application essentially or the part contributing to the prior art may be implemented in a form of a software product. The software product is stored in a readable storage medium, such as a floppy disk, a hard disk or a compact disc of a computer, and includes several instructions for instructing a computer device (which may be a personal computer, a server, a network device, or the like) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An information transmission method, comprising:
receiving downlink control information corresponding to a message;
in a case that a reception time window of the message starts or ends within a continuous monitoring time period of a first control resource set (CORESET) corresponding to the message, determining that reception of the downlink control information is not performed on the first CORESET corresponding to the message, wherein the continuous monitoring time period of the first CORESET starts at a starting symbol of the first CORESET and ends at an ending symbol of the first CORESET; and
in a case that the downlink control information is received on a second CORESET completely located within the reception time window of the message, receiving the message corresponding to the downlink control information.

2. The information transmission method according to claim 1, wherein the downlink control information is carried on a physical downlink control channel (PDCCH), and the CORESET comprises a time-frequency resource of the PDCCH.

3. The information transmission method according to claim 1, wherein the message comprises a random access response (RAR) message.

4. The information transmission method according to claim 1, wherein the message comprises a contention resolution message.

5. An information transmission apparatus, comprising:
a first circuitry, configured to receive downlink control information corresponding to a message in a case that a reception time window of the message starts or ends within a continuous monitoring time period of a first control resource set (CORESET) corresponding to the message, the reception of downlink control information corresponding to the message is not performed on the first CORESET corresponding to the message, wherein the continuous monitoring time period of the first CORESET starts at a starting symbol of the first CORESET and ends at an ending symbol of the first CORESET; and
a second circuitry, configured to receive the message corresponding to the downlink control information in a case that the downlink control information is received on a second CORESET completely located within the reception time window of the message.

6. The information transmission apparatus according to claim 5, wherein the downlink control information is carried on a physical downlink control channel (PDCCH), and the CORESET comprises a time-frequency resource of the PDCCH.

7. The information transmission apparatus according to claim 5, wherein the message comprises a random access response (RAR) message.

8. The information transmission apparatus according to claim 5, wherein the message comprises a contention resolution message.

9. A network device, comprising:
circuitry configured to:
transmit downlink control information corresponding to a message in a case that a reception time window of the message starts or ends within a continuous monitoring time period of a first control resource set (CORESET) corresponding to the message, wherein the reception of downlink control information is not performed by a terminal on the first CORESET corresponding to the message, and wherein the continuous monitoring time period of the first CORESET starts at a starting symbol of the first CORESET and ends at an ending symbol of the first CORESET; and
transmit the message corresponding to the downlink control information in a case that the downlink control information is transmitted on a second CORESET completely located within the reception time window of the message.

10. The network device according to claim 9, wherein the downlink control information is carried on a physical downlink control channel (PDCCH), and the CORESET comprises a time-frequency resource of the PDCCH.

11. The network device according to claim 9, wherein the message comprises a random access response (RAR) message.

12. The network device according to claim 9, wherein the message comprises a contention resolution message.

* * * * *